US012777256B2

(12) United States Patent
Fitzpatrick et al.

(10) Patent No.: US 12,777,256 B2

(45) **Date of Patent: *Oct. 27, 2026**

(54) SYSTEM AND METHOD FOR GUNSHOT DETECTION

(71) Applicant: Auris, LLC, New Orleans, LA (US)

(72) Inventors: Brian C. Fitzpatrick, New Orleans, LA (US); Robert McGrath, Lisle, IL (US)

(73) Assignee: Auris, LLC, New Orleans, LA (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/732,541

(22) Filed: Jun. 3, 2024

(65) Prior Publication Data

US 2026/0039962 A1 Feb. 5, 2026

Related U.S. Application Data

(63) Continuation-in-part of application No. 18/380,134, filed on Oct. 13, 2023, now Pat. No. 12,003,858, (Continued)

(51) Int. Cl.

*H04N 23/695* (2023.01)
*G01S 5/22* (2006.01)
(Continued)

(52) U.S. Cl.

CPC ............ *H04N 23/695* (2023.01); *G01S 5/22* (2013.01); *G08B 13/1672* (2013.01); (Continued)

(58) Field of Classification Search

CPC ........... G08B 13/1672; G08B 13/1963; G08B 13/19697; G08B 21/00; G08B 13/00; (Continued)

(56) References Cited

U.S. PATENT DOCUMENTS

| | | | |
|---|---|---|---|
| 10,424,048 | B1 | 9/2019 | Calhoun et al. |
| 11,282,353 | B1 | 3/2022 | Fowler et al. |

(Continued)

FOREIGN PATENT DOCUMENTS

| | | |
|---|---|---|
| WO | WO-2013/015461 A1 | 1/2013 |

OTHER PUBLICATIONS

International Search Report and Written Opinion on PCT App. PCT/US2023/035133 dated Nov. 17, 2023 (4 pages).

*Primary Examiner* — Adnan Aziz

(74) *Attorney, Agent, or Firm* — Foley & Lardner LLP

(57) ABSTRACT

A system may include a first computing device comprising a first processor configured to receive a set of audio data from a microphone; execute a first sound detection machine learning model using the set of audio data as input to determine whether the set of audio data corresponds to an actionable sound, the set of audio data comprising a plurality of sounds; and responsive to determining the set of audio data corresponds to the actionable sound, transmit the set of audio data to a second computing device. The system may include the second computing device comprising a second processor configured to execute a time detection machine learning model using the set of audio data as input to determine an instance and time of the actionable sound within the set of audio data; and determine a location of the actionable sound based at least on the time of the actionable sound.

20 Claims, 23 Drawing Sheets

Related U.S. Application Data which is a continuation of application No. 17/965,648, filed on Oct. 13, 2022, now Pat. No. 11,792,520.

(51) Int. Cl.

| | |
|---|---|
| ***G08B 13/16*** | (2006.01) |
| ***G08B 13/196*** | (2006.01) |
| ***H04N 7/18*** | (2006.01) |
| ***H04R 1/40*** | (2006.01) |

(52) U.S. Cl.

CPC ... *G08B 13/1963* (2013.01); *G08B 13/19697* (2013.01); *H04R 1/406* (2013.01)

(58) Field of Classification Search

CPC ...... G08B 23/00; G08B 25/00; H04N 23/695; H04R 1/406; G01S 5/22

See application file for complete search history.

(56) References Cited

U.S. PATENT DOCUMENTS

| | | | | |
|---|---|---|---|---|
| 2010/0245582 | A1 | 9/2010 | Harel | |
| 2016/0241818 | A1 | 8/2016 | Palanisamy et al. | |
| 2017/0154638 | A1 | 6/2017 | Hwang et al. | |
| 2017/0353788 | A1 | 12/2017 | Tatematsu et al. | |
| 2019/0259378 | A1* | 8/2019 | Khadloya ............... | G06F 3/167 |
| 2019/0311604 | A1 | 10/2019 | Morehouse et al. | |
| 2019/0350065 | A1 | 11/2019 | Stuby et al. | |
| 2020/0066257 | A1* | 2/2020 | Smith ..................... | G10L 15/08 |
| 2020/0143649 | A1 | 5/2020 | Coonley et al. | |
| 2020/0217468 | A1 | 7/2020 | Brown et al. | |
| 2020/0381006 | A1 | 12/2020 | Davis et al. | |
| 2021/0110843 | A1 | 4/2021 | Davis et al. | |
| 2022/0050479 | A1 | 2/2022 | Hurst et al. | |
| 2022/0060663 | A1 | 2/2022 | Guibene et al. | |
| 2022/0295176 | A1 | 9/2022 | Eswara et al. | |
| 2023/0130926 | A1* | 4/2023 | Hangartner ............ | G08B 25/10 340/539.14 |

* cited by examiner

200

700

SYSTEM AND METHOD FOR GUNSHOT DETECTION

CROSS-REFERENCE TO RELATED APPLICATIONS

This application claims the benefit of priority as a continuation-in-part to U.S. patent application Ser. No. 18/380,134, filed Oct. 13, 2023, which claims the benefit of priority as a continuation to U.S. patent application Ser. No. 17/965,648, filed Oct. 13, 2022, the entirety of which is incorporated by reference herein.

TECHNICAL FIELD OF DISCLOSURE

The present invention relates generally to gunshot detection, and more particularly to gunshot detection using a mesh of recording devices.

BACKGROUND

Large cities or cities with large populations can host a significant amount of crime. The crime can be non-violent or violent crime and involve the use of firearms. During crimes involving firearms, a user may fire a firearm into the air or at various objects. Often times, authorities are notified about such a crime after the crime occurs and after the individuals involved have traveled away from the area. Even in instances in which authorities are notified of a crime while the crime is occurring, the notification may take time to travel to the authorities and the authorities may not know the location of the crime or the authorities may receive the incorrect location of the crime. These causes for delay may result in the individuals committing the crime not being identified and/or the individuals having time to remove any evidence of being at the scene.

SUMMARY

One solution to quickly identifying crimes involving firearms and the locations of such crimes involves placing recording devices around a city. The recording devices may continuously stream audio data generated by the recording devices from sound of the surrounding areas to a remote server. The remote server can analyze the audio data to determine whether the audio data includes the sounds of at least one gunshot. If streamed audio from a recording device includes sounds of at least one gunshot, the remote server can identify the location of the device and determine the location is where the gunshot occurred.

Detecting a gunshot in the above-described manner can have a few technical drawbacks. For example, streaming audio across a network can require a significant amount of bandwidth. In a large city, a large number of recording devices may be required to canvas the entire city. Continuously streaming audio to the server from each device can require a significant amount of bandwidth on the network. Further, because of the large number of recording devices that stream the audio, continuously analyzing each of the streams may require a significant amount of processing power at the remote computing device to accurately detect gunshots. Additionally, continuously recording audio and transmitting to a centralized location can create the potential of capturing sounds other than gunshots which may or may not be legally or ethically captured.

Another problem is that an identification of a gunshot in audio streamed from a recording device may not enable detection of an accurate location of a gunshot. The sound waves of gunshots can be loud and can echo off of buildings surrounding the streets in a city. Accordingly, gunshots may travel a large distance in a city and multiple recording devices may record audio of the gunshot, even when the recording devices are not the closest recording devices to the location of the actual gunshot. This problem can be compounded when the recording devices are placed sporadically around the city, particularly when some recording devices are placed in locations in which the echoes can be detected and in other locations where the recording devices are blocked from recording sound. It can be difficult to predict a location of a gunshot if one recording device that is nearest to the gunshot is blocked from recording the gunshot and a recording device further away from the gunshot detects an echo of the gunshot.

Implementations of the systems and methods described herein may overcome the aforementioned technical problems. To do so, for example, a set of recording devices may be configured with housings that can be distributed across a metropolitan environment (e.g., a city) such that the recording devices are not blocked from recording audio. The housings of the recording devices can be mounted to light fixtures (e.g., light fixtures at the top of light posts or attached to buildings) that are interspersed throughout the metropolitan environment. One or more microphones may be mounted within or on the housings mounted to the light fixtures at the top of the lights posts such that the microphones can record sounds within a radius of the housing with little impedance from passerby objects that recording devices at lower heights may encounter. The recording devices may include processors that are configured to continuously receive and process audio recordings from the microphones to determine when the audio recordings include audio of a gunshot.

A processor of a recording device may process received audio recordings by generating spectrograms from samples of the audio recordings at set or predetermined intervals. The processor may use machine learning techniques on the spectrograms to detect whether the spectrograms include audio data of a gunshot. As described herein, machine learning techniques may include deep learning techniques. The deep learning techniques can provide adaptive noise suppression by creating specialized digital filtration for each sensor's installed location, which can provide a silent steady state. For example, as the processor receives audio data from the microphone, the processor may generate spectrograms of the audio data for overlapping and/or non-overlapping time periods. The processor may execute a machine learning model with the spectrograms as input to determine whether the spectrograms include audio data of at least one gunshot. If the processor identifies a spectrogram that includes audio data of at least one gunshot, the processor may transmit the spectrogram or the audio data that is depicted in the spectrogram to a remote server (e.g., a cloud server) for further processing. In this way, the processor may avoid continuously streaming audio data to the remote server for processing, instead only sending audio data and/or a spectrogram of the audio data to the remote server upon determining the spectrogram is associated with a gunshot, reducing the bandwidth requirements of locating gunshots at the remote server.

The remote server may receive spectrograms and/or audio data associated with a gunshot from multiple recording devices and determine the location of the gunshot. The remote server may do so using a combination of machine learning and multilateration techniques. For example, the remote server may execute a machine learning model on the received spectrograms and/or generate spectrograms from received audio data and execute the machine learning model based on the generated spectrograms. In doing so, the machine learning model may identify portions or impulses of the spectrograms that correspond to gunshots. The remote server may identify times of detected gunshots from each of the spectrograms and use multilateration techniques on the received times and stored locations of the recording devices that transmitted the spectrograms and/or audio data. The remote server may identify the location of the gunshot based on the multilateration techniques. The remote server may than transmit a notification of a time of the gunshot (e.g., a time in which the gunshot occurred or was first recorded) and/or the identified location to a server or computing device accessed by authorities (e.g., police officers or detectives) to inform the authorities of the gunshot.

By using machine learning models and multilateration techniques in this way, the recording devices and the remote server may quickly and accurately determine a time and location of a gunshot. Accordingly, the remote server may transmit a notification of the gunshot to authorities more quickly than systems using conventional technologies. The fast notification may enable the authorities to arrive at the site of the gunshot in time to potentially apprehend any bad actors at the site and/or to collect evidence of any crimes that were committed.

In one embodiment, an apparatus for detecting gunshots is disclosed. The apparatus may include a device housing configured to removably couple to a light post or a light fixture; a microphone inside or mounted to the device housing; and a processor inside the device housing and electrically coupled to the microphone. The processor can be configured to receive audio data from the microphone; execute a machine learning model using the audio data as input to determine whether the audio data corresponds to a gunshot; and responsive to determining the audio data corresponds to a gunshot, transmit the audio data to a remote processor.

In another embodiment, a method for detecting gunshots is disclosed. The method may include receiving, by a recording processor of an edge recording device, a first set of audio data from a microphone inside or mounted to a housing of the edge recording device, the first set of audio data comprising a sound recording; executing, by the recording processor, a first machine learning model using the first set of audio data as input to determine the first set of audio data is associated with a gunshot; responsive to determining the first set of audio data is associated with a gunshot, transmitting, by the recording processor, the first set of audio data to a first remote processor; receiving, by the first remote processor, the first set of audio data as a set of audio data of a plurality of sets of audio data received from a plurality of edge recording devices, each of the plurality of sets of audio data transmitted to the first remote processor in response to a determination the set is associated with a gunshot; iteratively executing, by the first remote processor, a second machine learning model using each of the plurality of sets of audio data as input to determine a time of a gunshot for each set of audio data; executing, by the first remote processor, a multilateration model using the time of the gunshot for each set of audio data to determine a location of a first gunshot; and transmitting, by the first remote processor, an indication of the location to a second remote processor of a second remote computing device.

In another embodiment, a system for detecting gunshots is disclosed. The system may include a first remote processor of a first remote computing device remote from a set of edge recording devices, the first remote processor coupled to a first remote non-transitory memory of the first remote computing device, wherein the first remote processor is configured to receive a set of audio data from each of a subset of the set of edge recording devices, each set of audio data transmitted to the remote processor in response to a determination that a gunshot is associated with the set of audio data; execute a machine learning model using each set of audio data as input to determine a time of a gunshot for each set of audio data; execute a multilateration model using the time of the gunshot for each set of audio data and a location of each of the subset of edge recording devices as input to determine a location of the gunshot; and transmit an indication of the location to a second remote processor of a second remote computing device.

The system may further include a recording processor of an edge device of the subset of edge devices. The recording processor may be in communication with an edge non-transitory memory of the edge device and a microphone mounted on or in a housing of the edge device. The recording processor may be configured to receive a first set of audio data from the microphone, the first set of audio data comprising a sound recording; execute a second machine learning model using the first set of audio data as input to determine the first set of audio data is associated with a gunshot; and responsive to determining the first set of audio data is associated with a gunshot, transmit the first set of audio data to the first remote processor as a set of audio data from the subset of edge devices.

In another embodiment, an apparatus is disclosed. The apparatus may include a device housing; a camera; a plurality of microphones inside or mounted to the device housing; and a processor inside the device housing and electrically coupled to the plurality of microphones. The processor can be configured to receive a set of audio data from each of the plurality of microphones; execute a machine learning model using each of the sets of audio data as input to determine whether the set of audio data corresponds to an actionable sound; determine a location of the actionable sound relative to a location of the camera based on a plurality of sets of audio data determined to correspond to the actionable sound; and rotate the camera towards the determined location of the actionable sound.

In another embodiment, a method is disclosed. The method may include receiving, by a processor of a computing device, a set of audio data from each of a plurality of microphones inside or mounted to a housing of the computing device; executing, by the processor, a machine learning model using each of the sets of audio data as input to determine whether the set of audio data corresponds to an actionable sound; determining, by the processor, a location of the actionable sound relative to a location of a camera based on a plurality of sets of audio data determined to correspond to the actionable sound; and rotating, by the processor, a camera (e.g., a camera coupled to a housing of the computing device) to have a field of view including the location of the actionable sound.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
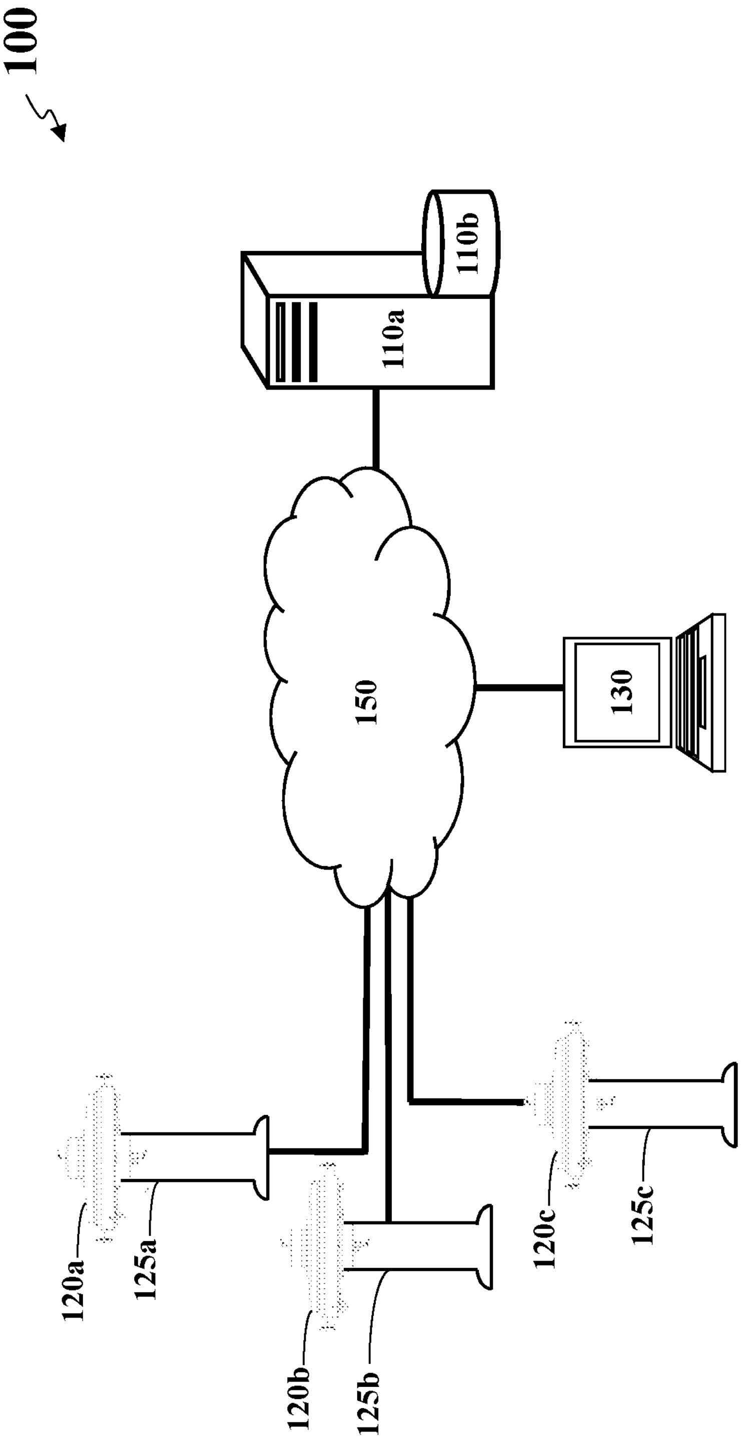
FIG. 1 illustrates components of a gunshot detection system, according to an embodiment.

The present disclosure is here described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

A computing system involving recording devices interspersed throughout a metropolitan area and a cloud server can operate together to detect and locate gunshots within the metropolitan area. In a non-limiting example, microphones of recording devices mounted to light fixtures (e.g., light fixtures on light posts or sides of buildings) throughout a city can record audio data of a gunshot. Such light posts can be utility poles. The recording devices may each execute a machine learning model to determine the audio data includes sounds of a gunshot and transmit the audio data to a cloud server. The cloud server may receive and analyze the audio data from the different recording devices to determine the times in which each recording device recorded the audio data (e.g., the times of arrival). Based on the times, the cloud server can determine the location and/or time in which the gunshot occurred. The cloud server can generate a notification containing the location and/or time and transmit the notification to a computing device operated by authorities, thus informing the authorities of the gunshot. FIG. 1 depicts an example environment that includes example components of a system that includes such recording devices and such a cloud server. Various other system architectures may include more or fewer features and/or may utilize the techniques described herein to achieve the results and outputs described herein. Therefore, the system depicted in FIG. 1 is a non-limiting example.

FIG. 1 illustrates a gunshot detection system 100, according to an embodiment. The system 100 may include an analytics server 110*a*, a system database 110*b*, recording devices 120*a-c* (collectively, recording devices 120 and individually, recording device 120), an administrator computing device 130, and/or a controller computing device 140. The above-mentioned components may be connected to each other through a network 150. Examples of the network 150 may include, but are not limited to, private or public LAN, WLAN, MAN, WAN, and the Internet. The network 150 may include wired and/or wireless communications according to one or more standards and/or via one or more transport mediums.

The communication over the network 150 may be performed in accordance with various communication protocols such as Transmission Control Protocol and Internet Protocol (TCP/IP), User Datagram Protocol (UDP), and IEEE communication protocols. In one example, the network 150 may include wireless communications according to Bluetooth specification sets or another standard or proprietary wireless communication protocol such as 802.11ah. In another example, the network 150 may also include communications over a cellular network, including, e.g., a GSM (Global System for Mobile Communications), CDMA (Code Division Multiple Access), and/or EDGE (Enhanced Data for Global Evolution) network.

The gunshot detection system 100 is not confined to the components described herein and may include additional or other components, not shown for brevity, which are to be considered within the scope of the embodiments described herein.

The analytics server 110*a* may be any computing device comprising a processor and non-transitory machine-readable storage capable of executing the various tasks and processes described herein. Non-limiting examples of such computing devices may include workstation computers, laptop computers, server computers, and the like. While the system 100 includes a single analytics server 110*a*, the analytics server 110*a* may include any number of computing devices operating in a distributed computing environment, such as a cloud environment.

The system database 110*b* may be a relational database or any other type of database. The system database 110*b* may be stored in memory of the analytics server 110*a* or one or more other computing devices. The system database 110*b* may store data or information about recording devices 120. For instance, the system database 110*b* may store the locations of the recording devices 120, identifications or identifiers (e.g., numerical or alphanumerical identifications or identifiers) of the recording devices 120, and/or identifications or identifiers of connections the analytics server 110*a* has with the recording devices 120.

The recording devices 120 may be computing devices similar to the analytics server 110*a* that are located at various locations around a metropolitan area. The recording devices 120 may include processors, memory, and/or microphones that are attached to or mounted in housings (e.g., the housings shown and described with reference to FIG. 8). The microphones may be or include one or more omnidirectional microphones configured to detect sounds from multiple directions (e.g., from all directions). The housings may be removably coupled to light fixtures (e.g., municipal street light fixtures) on light posts 125*a-c* (collectively, light posts 125 and individually, light post 125) around the metropolitan area. For example, the housings may fasten (e.g., through a "twist lock" plug and socket system) to light fixtures at the tops of the light posts 125. By fastening to the light fixtures at the tops of the light posts 125, the microphones attached to the housings may better capture the sounds of the surrounding environment because the microphones are higher and not blocked by objects or pedestrians that walk past the microphones. Further, because the housings are on top of light posts 125 instead of at ground level, the recording devices 120 may be less accessible to malicious individuals that may attempt to damage or tamper with the recording devices 120.

The recording devices 120 may be powered by the same or a common power source to the light posts 125 to which the recording devices 120 are coupled. For example, a light post 125 may be electrically connected to a power grid that provides power to the metropolitan area. A recording device 120 connected to the light post 125 may couple directly to the light post 125 in series or parallel to receive power from the grid. In some cases, the recording device 120 may be directly connected to the power grid through a power line. Each of the recording devices 120 around the metropolitan area may be similarly coupled to the power grid. In this way, the recording devices 120 may receive adequate power to power the processors and microphones of the recording devices 120 for continuous recording and/or processing of audio data.

The recording devices 120 may not store the audio recordings that the recording devices 120 generates. Instead, the recording devices 120 may generate the recordings, analyze the recordings to determine if the recordings include audio of any gunshots, and discard any recordings that do not contain gunshot audio. In some cases, the recording devices 120 may transmit audio segments (or spectrograms of such audio segments) the recording devices 120 determine contain audio data of gunshot to the analytics server 110*a*. The recording devices 120 may discard such audio segments from memory subsequent to transmitting the audio segments to the analytics server 110*a*. Accordingly, the recording devices 120 may conserve memory resources.

The housings of the recording devices 120 may be configured to receive photoelectric cells. The photoelectric cells may operate to detect light over the course of a day and night. The photoelectric cells may operate for security to cause lights (e.g., light bulbs) of the light posts 125 to turn on at night when the sun is not out and off during the day when the sun is out. The photoelectric cells may be powered by the power grid or another power source common to the recording devices 120 and/or the lights of the light posts 125. In some cases, a photoelectric cell, the recording device 120, and the light of the light post 125 can be powered by separate power sources (e.g., the recording device 120 and the photoelectric cell coupled to the recording device 120 may be powered by a stored battery within the recording device 120 while the light may be powered by the energy grid).

The microphones of the recording devices 120 may continuously record audio data (e.g., sounds) of their surrounding environments. The microphones may record the audio data over time. As the microphones are recording the audio data, the microphones may transmit the audio data to the processors of recording devices 120 (e.g., the processors mounted to or inside the same housings as the microphones).

The processors of the recording devices 120 may receive and process the audio data from the recording devices 120. For example, a processor of a recording device 120 may receive audio data that a microphone of the recording device 120 recorded over the course of a time frame. The processor may process the audio data by generating a spectrogram from the audio data that illustrates the sound wave and/or frequencies of the audio data from the time frame.

The spectrogram may be a visual diagram of the strength of the signal strength (e.g., loudness) of a sound signal (e.g., a sound wave) over time at various frequencies. The spectrogram may be a visual diagram of the strength of the signal strength (e.g., loudness) of a sound signal (e.g., a sound wave) over time at various frequencies. The spectrogram or multiple spectrograms from the same event (e.g., same gunshot) may be also analyzed for total envelope content, timing, as well as evidence of specific characteristics that identify pertinent information regarding the weapon(s), round(s) or shooter(s) involved in the event. A spectrogram or multiples thereof may also be archived and forensically analyzed for comparison to other events to identify similarities between events. A machine learning model (e.g., a deep learning model) may provide scoring on the similarity between events.

The processor may execute a machine learning model (e.g., a neural network, a support vector machine, a random forest, etc.) that has been trained to analyze spectrograms to detect gunshots. The processor may execute the machine learning model with the spectrogram to determine whether the spectrogram (e.g., the spectrogram as a whole) illustrates audio data of a gunshot (e.g., includes sounds of at least one gunshot). The machine learning model may output a binary output (e.g., a two-class output) indicating whether the audio data includes audio of a gunshot or not.

In some cases, the machine learning model may output confidence scores indicating a likelihood that the spectrogram includes audio data of a gunshot. The machine learning model may output a confidence score indicating the likelihood that the spectrogram includes audio data of a gunshot and/or a confidence score indicating the likelihood that the spectrogram does not include audio data of a gunshot. The machine learning model or the processor executing the machine learning model may compare the confidence score for the likelihood that the spectrogram includes audio data of a gunshot to a threshold (e.g., a defined threshold). If the confidence score is higher than the threshold, the machine learning model or the processor may determine the spectrogram likely includes audio data of a gunshot. Otherwise, the machine learning model or the processor may determine the spectrogram likely does not include audio data of a gunshot.

Upon determining the audio data likely or does include audio data of the gunshot, the recording device 120, may transmit the audio data and/or the spectrogram of the audio data to the analytics server 110*a*. The analytics server 110*a* may receive the audio data and/or the spectrogram from the recording device 120 and/or other recording devices 120 that similarly recorded and detected audio data that contains a gunshot. The analytics server 110*a* may generate spectrograms from any audio data (e.g., sets of audio data received from individual recording devices 120) the analytics server 110*a* receives from the recording devices 120. The analytics server 110*a* may process the audio data and/or spectrograms to determine a time and/or a location of the gunshot. For instance, the analytics server 110*a* may store a machine learning model (e.g., a neural network, support vector machine, random forest, etc.) that is trained to use object recognition techniques to detect gunshots at individual pulses or times of spectrograms. The analytics server 110*a* may iteratively execute the machine learning model with each of the spectrograms the analytics server 110*a* receives from the recording devices 120. The machine learning model may output times of one or more gunshots from each spectrogram upon being executed. The times may indicate the times (e.g., the times of arrival of the sounds of the gunshots) in which each recording device 120 recorded gunshots within the time periods of the spectrograms.

The analytics server 110*a* may identify the times of the recorded gunshots and use the times to determine the locations of the gunshots. The analytics server 110*a* may do so using the identified times and stored locations of the recording devices 120 that recorded the gunshots. For instance, the analytics server 110*a* may identify the recording devices 120 that transmitted the spectrograms or the audio data of the gunshots. The analytics server 110*a* may do so by identifying identifiers of the connections through which the analytics server 110*a* received the audio data and/or spectrograms or by identifying identifiers (e.g., IP addresses) in the data packets that contained the received audio data and/or spectrograms. The analytics server 110*a* may use the identifiers in a look-up technique through the system database 110*b* to identify the locations of the recording devices 120 that transmitted the spectrograms and/or audio data of the recorded gunshots.

The analytics server 110*a* may execute a multilateration model to determine a location of a gunshot based on the detected times of the gunshots and the locations of the recording devices 120 that detected the gunshots. The multilateration model may be or include executable instructions stored by the analytics server 110*a* in memory that, upon execution, determines the locations of gunshots. For example, executing the multilateration model may cause the multilateration model to calculate a potential location of the gunshot for individual groupings of three recording devices 120 (e.g., groupings of recording devices that transmitted audio data of a gunshot). The multilateration model may do so, for instance, by applying the following set of equations:

$$(x_s - x_1)^2 + (y_s - y_1)^2 = (r_s - s_1 r_1)^2$$

$$(x_s - x_2)^2 + (y_s - y_2)^2 = (r_s - s_2 r_2)^2$$

$$(x_s - x_3)^2 + (y_s - y_3)^2 = (r_s - s_3 r_3)^2$$

where r is the time difference of arrival, x and y are the coordinates (e.g., the geographic locations), and s is the solution for the variable. The detected times of the gunshots and the locations of the recording devices 120 in the groupings of three recording devices 120 may be used as input into the equations input. In this way, the analytics server 110*a*, may calculate potential locations of the gunshot detected by the different recording devices 120.

Upon calculating the potential locations, the multilateration model may iteratively filter out the different groupings of recording devices 120. For example, the multilateration model may calculate an average gunshot location from the calculated potential gunshot locations of groupings of three recording devices 120 that detected the gunshot. The multilateration model may then use a distance formula between the potential locations of the gunshot for each grouping of recording devices 120 to calculate distances between the potential locations of the groupings and the average location of all of the groupings. The multilateration model may identify the grouping or a set number of groupings associated with the largest distance or distances and remove the identified grouping or set from the list. In some cases, the multilateration model may remove any groupings from the list that are associated with a distance that exceeds a threshold. The multilateration model may then calculate a new average location from the potential locations of the remaining recording devices 120 on the list. The multilateration model may calculate distances between the potential locations and the new average location for the remaining groupings of recording devices 120 and remove any groupings of recording devices 120 that are associated with a largest calculated distance or a distance that exceeds the same or a different threshold. The multilateration model may repeatedly perform this process until only one grouping of recording devices 120 is left on the list. The multilateration model may identify the potential location of the remaining grouping as the location of the gunshot.

The analytics server 110*a* may identify and transmit the location of the shot to the administrator computing device 130. In doing so, the analytics server 110*a* may transmit the location and/or a timestamp indicating a time of the gunshot to the administrator computing device 130. The administrator computing device 130 may be any computing device that is owned and/or accessed by authorities (e.g., police officers or detectives). The authorities may view the location and/or the timestamp at a user interface and travel to the location (e.g., travel to the location to investigate what caused the gunshot to occur and/or the outcome of the gunshot).

In some cases, the analytics server 110*a* may transmit the location and/or the timestamp of the gunshot to the controller computing device 140. The controller computing device 140 may be any computing device that is configured to control a device 145 (e.g., a drone (an unmanned vehicle) such as an aerial drone or grounded drone equipped with a camera to capture images and/or videos of different areas). The analytics server 110*a* may transmit a message including the location and/or the timestamp to the controller computing device 140. The controller computing device 140 may, in some cases automatically upon receipt of the message, transmit instructions including the location and/or directions to the location, to the device 145 to cause the device 145 to travel to the location. The device 145 may capture images and/or video of the location upon reaching the location. In doing so, the device 145 may capture evidence of the gunshot and any crimes that were committed with the shooting of the gunshot by capturing images of the individuals involved and/or the surroundings of the gunshot (e.g., broken glass that has not been swept up yet, images of individuals scrubbing fingerprints, etc.). Because the process may occur automatically and in real-time, the device 145 may be able to capture evidence of a crime relatively quickly compared with conventional systems and/or methods.

The decrease in processing time to identify the location of the shooting event may aid in dispatching high speed evidence collecting resources (Drone as a First Responder "DFR"). For example, in some cases, the device 145 may capture infrared/thermal imagery of the scene prior to items cooling down, identifying within its field of view the location of high temperature elements in the vicinity of the crime scene (e.g., bullet casings, recently fired weapons, living or recently living bodies, running vehicles, recently running vehicles, etc.). Times and temperatures are recorded by a camera of the device 145 for each element of interest. This imagery can be overlaid with visible light imagery to provide investigators with actionable data relevant to the crime scene. Often dramatically reducing the time required to process the scene and respond to the crime. The imagery can also be provided live to first responders to determine if the event is still underway or over, and whether to dispatch SWAT, ambulances or investigators.

In some cases, one or more of the recording devices 120 may include cameras that are controlled by the processors of the recording devices 120. The cameras may continuously capture images or video of the areas surrounding the recording devices 120. The processors of the recording devices 120 may control the cameras (e.g., rotate or change the states of the cameras from on to off or vice versa). The processors may do so based on audio data the processors receive from the microphones of the recording devices 120. For example, a processor of a recording device 120 may determine a set of audio data contains a sound of a gunshot (or another quick and loud (e.g., sharp) noises such as car accidents, explosions, screams, etc., using a machine learning model). Upon determining the set of audio data contains a sound of a gunshot, in addition to or instead of transmitting the audio data to the analytics server 110*a*, the processor may determine a location of the gunshot. Upon determining the location, the processor may generate and/or transmit a control signal (e.g., a control signal containing identifications of elevation and azimuth) to the camera to control and/or rotate the camera in the direction or to the location of the gunshot. Accordingly, the processor can cause the camera to capture images of the aftermath of the gunshot, which may be useful to authorities for gathering evidence of a crime.

To determine the location of the gunshot, the recording devices 120 may include multiple sensors that are mounted on the housings of the recording devices 120. The processors of the recording devices 120 may use multilateration techniques based on times of arrival of the gunshot sound at each of the multiple sensors on the housings of the recording devices 120. For example, a recording device 120 may include five sensors that are mounted in a housing. Each sensor may detect a sound of a gunshot. The sensors may transmit the gunshot sound in audio data to a processor of the recording device 120. The processor may generate a spectrogram from the audio data for each sensor. The processor may execute a machine learning model with the spectrograms to determine if the audio data contains audio data of a gunshot. Upon determining the spectrograms contain audio data of a gunshot, the processor may execute another machine learning model to detect times of the gunshots from the spectrograms (e.g., times of impulses of gunshot audio from the spectrograms). The processor may then use the multilateration techniques described herein based on the times of the gunshots in each of the spectrograms and the locations of the microphones within the housing of the recording device. The processor may determine the times of the gunshots and use multilateration techniques to determine a location of the gunshot using the same or similar techniques to the analytics server 110*a*.

Upon determining the location of the gunshot, the processor of the recording device 120 may determine the direction of the gunshot relative to the determined location. To do so, for example, the processor may compare the location of the recording device 120 (e.g., the geographical location of the recording device 120) with the determined location of the gunshot. The processor may determine a vector from the location of the recording device 120 to the location of the gunshot. The processor may transmit the vector to the camera to cause the camera to rotate to point to the location. In some cases, the processor may compare the vector to a vector indicating the current direction in which the camera is pointing. In such cases, the processor may determine a difference between the two vectors to generate a change in position vector or rotation vector. The processor may transmit the change in position vector or rotation vector to the camera to cause the camera to rotate the amount of the change in position vector or rotation vector. In this way, the processor of the recording device 120 may control the camera to point at locations of gunshots upon detecting the gunshots.

In instances in which the camera is in an off state (e.g., not capturing images or recording), a processor of a recording device 120 may additionally change the state of the camera to an "on" state (e.g., capturing images or recording). For example, upon determining a location of a gunshot, the processor may transmit a control signal to the camera to rotate the camera to capture images and/or video of the location of the gunshot. The processor may additionally transmit a control signal to the camera that causes the camera to turn on and/or begin capturing images and/or video. The control signal may cause the camera to remain on and/or capture images and/or video indefinitely until the camera is manually turned off or to do so for a defined amount of time. The camera may capture the images and/or video and transmit the images and/or video to the processor. The processor may store the images and/or video in memory for later retrieval. In this way, the processor may save memory storage and/or energy requirements of operating a camera by only capturing images and/or video when the images and/or video may be relevant to a gunshot investigation.

In some cases, upon determining the direction or location of the gunshot or that a gunshot occurred, the recording device 120 may transmit a message to the administrator computing device 130. The message may indicate that a gunshot was detected at the recording device 120 and/or the determined location of the gunshot. In some cases, the recording device 120 may transmit images or video the camera captured of the determined location of the gunshot. In some cases, the video may be a livestream of the area. An operator at the administrator computing device 130 may view the images, video, and/or livestream and determine whether to take any action regarding the gunshots. In some cases, the recording device 120 may transmit an indication of the location to the controller computing device 140. Upon receipt of the indication, the controller computing device 140 may control the device 145 to move the device 145 to the location to capture images or video of the location. Such imagery can be provided live to first responders to determine if an event (e.g., a gunshot, accident, fight, etc.) is still underway or over, and whether to dispatch SWAT, ambulances, or investigators.

In some cases, the recording device 120 may store and execute a machine learning model that is configured to detect auto-accidents. In such cases, the recording device 120 may record audio data and insert the audio data into the machine learning model as described herein (e.g., insert spectrograms of the audio data into the machine learning model). The recording device 120 may execute the machine learning model based on the audio data and the machine learning model may output an indication of whether the audio data contains audio of an auto-accident. Responsive to detecting an indication that the audio data contains audio of an auto-accident, the recording device 120 may determine a location auto-accident using the systems and methods described herein and control the camera to capture imagery of the location of the auto-accident. The recording device 120 may livestream the imagery to a computer accessed by first responders such that the first-responders can view of the scale and scope of the auto-accident. In some cases, the recording device 120 may transmit an indication of the location of the auto-accident to the controller computing device 140 to control the device 145 to move the device 145 to the location of the auto-accident. The recording device 120 may be similarly configured to identify and capture imagery or transmit locations of calls for help or duress. Because the recording device 120 can begin recording upon detection of an event (e.g., an event that produced an actionable sound, such as a gunshot, a car crash, or a scream), the recording device 120 can capture video of the event prior to an operator paying attention to the livestream. Accordingly, the operator may later playback and/or review the recorded video to have more information about the cause of the event.

The recording device 120 can control nearby cameras to rotate to the source of an event (e.g., a gunshot, an auto-accident, a scream, etc.). For example, the recording device 120 can determine the location of the source of the sound relative to the recording device 120 and/or relative to the camera. The recording device 120 can transmit a control signal including an azimuth and an elevation to the camera (or a device controlling the camera) to cause the camera to rotate towards the location of the source of the location, thus managing the orientation of the camera. The control signal may trigger the camera to begin recording and/or livestreaming to the video management service. The recording device 120 can then transmit a message to a video management service (e.g., a computer accessed by the authorities) indicating the camera has been rotated and/or that event was detected within range of the camera, thus alerting any individuals accessing the computer that receives the message of the rotation and to begin viewing the livestream provided by the camera. Alternatively, the recording device 120 can transmit a message to the third party video management system that includes the location of the source of the event. The recording device 120 may include an elevation and/or azimuth (and/or pan, tilt, or zoom instructions) for a camera to rotate to capture the source of the event. The third-party video management system can receive the location and/or elevation and/or azimuth and control a camera or cameras (e.g., the camera or cameras closest and/or in a defined radius of the source of the event) to capture the source of the event (e.g., begin live streaming the source of the event). In this way, the recording device 120 can rotate or manage the orientation of the camera and/or trigger the camera to begin recording. In some cases, the recording device 120 can control the camera or transmit a message of a location and/or azimuth and/or elevation to capture a lane of egress associated with the event.

Figure 2:
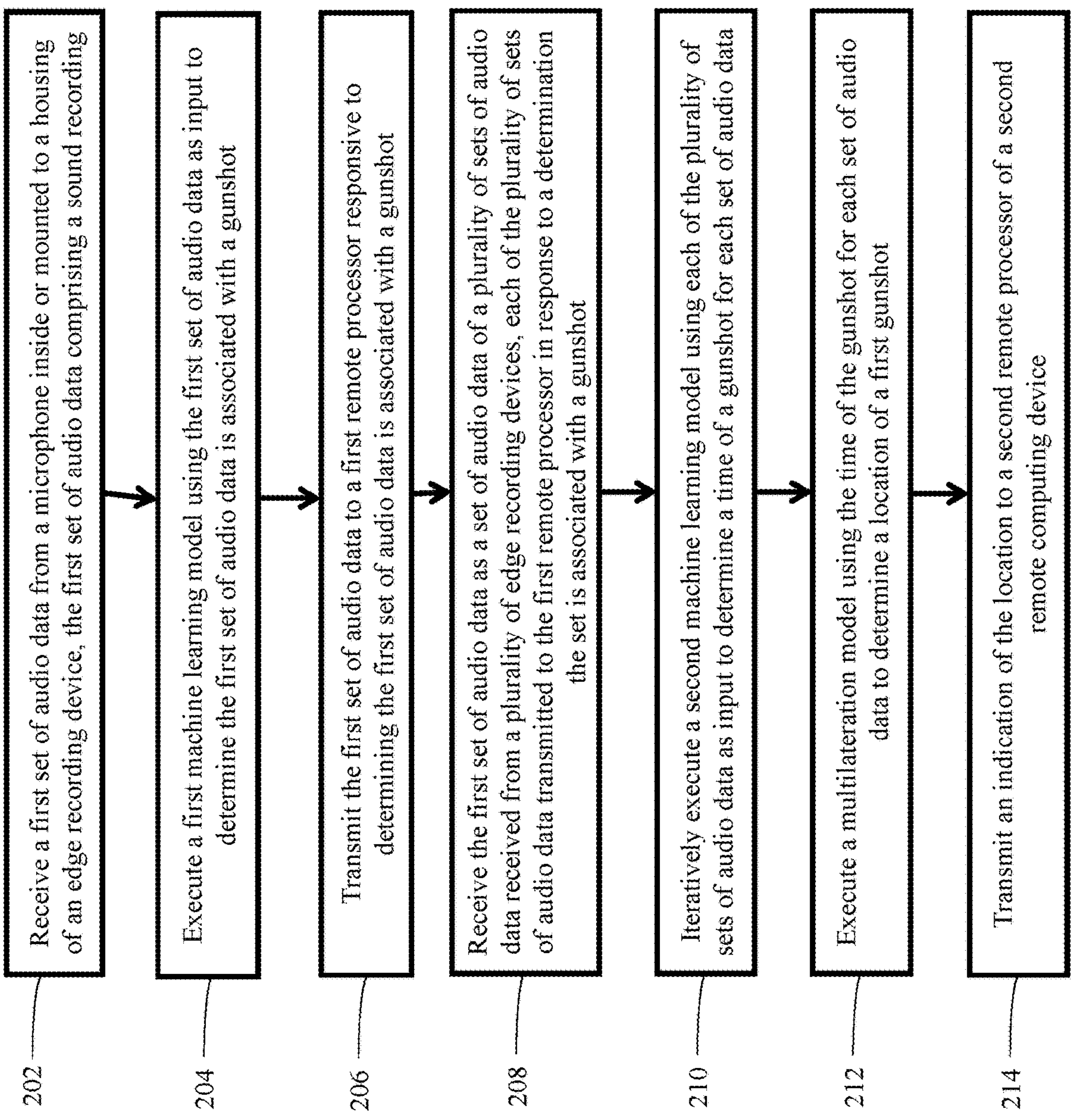
FIG. 2 is a flow diagram illustrating an exemplary method for detecting gunshots, according to an embodiment.

FIG. 2 is a flow diagram illustrating an exemplary method 200 for detecting gunshots, according to an embodiment. The method 200 may include steps 202-214. However, other embodiments may include additional or alternative steps, or may omit one or more steps altogether. The method 200 is described as being executed by a data processing system (e.g., the analytics server 110*a*, as described with reference to FIG. 1) and/or a recording device (e.g., the recording device 120). However, one or more steps of the method 200 may be executed by any number of computing devices operating in the distributed computing system. For instance, one or more computing devices may locally perform part or all of the steps described in FIG. 2 or a cloud device may perform such steps.

In step 202, the recording device may receive a first set of audio data from a microphone. The microphone may be inside or mounted to a housing of the recording device. The first set of audio data may be or include a sound recording from audio collected within a particular time frame. The microphone may continuously record sounds made in the environment surrounding the recording device. As the microphone is recording the sounds, the microphone can transmit the recorded sounds to a processor of the recording device for further processing.

The recording device may receive the first set of audio data and/or generate a spectrogram from the first set of audio data. The recording device may generate the spectrogram for the first set of audio data, for example, by calculating the Fourier transforms of various segments (e.g., equal-length segments) of the audio data in which the frequency of the audio data does not substantially change. The recording device may then generate a graph of the output of the Fourier transform calculation. The graph may illustrate the decibels of the audio data at different frequencies.

When generating the spectrogram for the first set of audio data, the recording device may include timestamps in the spectrogram of the real-world times in which the respective audio data was generated or received from the microphone or plurality of microphones (e.g., the times of arrival). The recording device may do so, for example, by storing and maintaining a clock indicating the current time. As the recording device receives the audio data of the first set of audio data, the recording device can label the audio data with timestamps indicating the times in which the recording device received the audio data or the times in which the recording device received the audio data minus a defined offset to account for the time it may take for the microphone to generate and transmit the audio data. The recording device can generate the spectrograms with the timestamps.

The recording device may generate spectrograms for sets of audio data from audio data generated by the microphone collected within defined time periods. For example, the recording device can sample data from different time periods into sets of audio data. The time periods may be overlapping or non-overlapping with each other. The time periods may have defined lengths. The recording device may segment the audio recordings into sets of audio data for the different time periods.

In step 204, the recording device may execute a first machine learning model (e.g., a sound detection machine learning model) using the first set of audio data as input. The first machine learning model may be a neural network, a support vector machine, a random forest, etc., that is trained to analyze spectrograms to determine whether gunshots occurred during the time period of the spectrogram. The first machine learning model may be a binary classification machine learning model that outputs a binary value indicating that a spectrogram does include audio data of a gunshot or that a spectrogram does not include audio data of a gunshot. The recording device may execute the first machine learning model using the spectrogram of the first set of audio data as input. The first machine learning model may output a binary value indicating whether the first set of audio data includes audio data of a gunshot. If the first machine learning model outputs a value indicating the first set of audio data does not include audio data of a gunshot, the recording device and data processing system may stop performing the method 200. However, if the first machine learning model outputs a value indicating the first set of audio data does include audio data of a gunshot, the recording device may determine the first set of audio data is associated with a gunshot.

Responsive to determining the first set of audio data is associated with a gunshot, in step 206, the recording device may transmit the first set of audio data to the data processing system (e.g., a first remote processor). The recording device may transmit the first set of audio data to the data processing system as the audio data itself or as the spectrogram the recording device generated from the first set of audio data for processing. In some cases, the recording device may label the audio data to indicate the times in which the audio data was generated by the microphone or received by the recording device (e.g., the times of arrival) and transmit the labeled audio data to the data processing system. The recording device may repeat steps 202-206 for each set of audio data the recording device receives and/or spectrogram the recording device generates.

In step 208, the data processing system may receive the first set of audio data. The data processing system may additionally receive sets of audio data from other recording devices that are in communication with the data processing system that perform the same or similar steps to steps 202-206. The data processing system may receive the sets of audio data and store the sets of audio data in memory with stored associations with identifiers of the recording devices that transmitted the sets of audio data. The data processing system may determine sets of audio data may contain audio data of the same gunshot based on the sets of audio data having at least one timestamp for audio data in common or based on receipt of the sets of audio data within a time threshold of each other. The data processing system may determine sets of audio data may contain data of the same gunshot and analyze the sets audio data responsive to the determination.

In some cases, the data processing system may receive the first set of audio data and query recording devices that are near (e.g., within a distance threshold of) the recording device that transmitted the first set of audio data for further audio data. The data processing system may include a timestamp indicating a time of receipt of audio data or of an identified gunshot from the audio data (identified as described in the step 210) in the query. The queried recording devices may receive the query and perform the steps 202-206 with audio data that contains a time that matches the timestamp of the query to determine whether to transmit a set of such audio data to the data processing system.

In instances in which the data processing system receives a set of audio data instead of a spectrogram of audio data, the data processing system may generate a spectrogram from the set of audio data. The data processing system may generate the spectrogram with timestamps the recording device includes with the set of audio data (e.g., timestamps of the labeled set of audio data). The data processing system may generate the spectrogram using the same or similar techniques to the techniques the recording device generates spectrograms, as described with reference to step 202.

In step 210, the data processing system may iteratively execute a second machine learning model (e.g., a time detection machine learning model) to determine a time of a gunshot for each set of audio data. The second machine learning model may be a neural network, a support vector machine, a random forest, etc., that is trained to analyze spectrograms to identify times of one or more gunshots from each individual spectrogram. The data processing system may execute the second machine learning model for each spectrogram that illustrates a set of audio data. The second machine learning model may output values identifying times (e.g., timestamps) of gunshots that the second machine learning models detects in the audio data of the spectrograms. The second machine learning model may identify the times from impulses in the spectrograms that correspond to the times. The data processing system may determine the output times of the second machine learning model are times of separate gunshots. The data processing system may use such times from the different spectrograms to determine a location of a gunshot or series of gunshots.

In some cases, the data processing system may select a time of a single gunshot from spectrograms from which the second machine learning model detected multiple gunshots. The data processing system may select the gunshot according to one or more gunshot selection rules. For example, the data processing system may store a rule that indicates to use the time of the first selected gunshot for each spectrogram the second machine learning model analyzes. In executing the rule, the data processing system may identify the earliest timestamp the second machine learning outputs for each spectrogram to use to detect the location of the gunshot. The data processing system may discard (e.g., remove from memory or from a cache) any other timestamps the second machine learning model output for the same spectrograms. The data processing system may select any number of times and/or times in any order (e.g., the second earliest timestamp, the third earliest timestamp, etc.). In this way, the data processing system may identify a time in which a single gunshot occurred and avoid identifying times of echoes of the gunshot or of gunshots that rapidly occurred after the initial gunshot, which may be common when gunshots are detected from an automated weapon.

In some cases, the second machine learning model may be trained or configured to detect times of gunshots from impulses using a sampling technique. For example, the data processing system can receive a set of audio data from a recording device that the recording device identified as containing a sound of a gunshot. The set of audio can contain one or more impulses of sounds of the gunshot and/or any other sound that the recording device captured with the sound of the gunshot. The data processing system can use an impulse detection algorithm (e.g., an onset detection algorithm) on the set of audio data to identify impulses (e.g., a list of sharp impulse sounds) within the set of audio data. The data processing system can generate a sample (e.g., a sound sample of a defined length, such as one second, that may be smaller than the length of the set of audio data) for each of the identified impulses, regardless of any overlap. The data processing system can generate the sample for each impulse such that the impulse is at a defined time within the sample, such as at 250 milliseconds (e.g., 250 milliseconds from the beginning of the sample). The data processing system can place the impulses at any point in time within individual samples. The second machine learning model may be trained or configured to determine whether or not impulses at the particular time within samples are gunshots or other actionable sounds, in some cases disregarding any impulses within the samples that are not at the defined time within the samples. The data processing system can input the respective samples into the second machine learning model and execute the second machine learning model. The execution or executions can cause the second machine learning model to output indications of whether the impulses are gunshots or actionable sounds or not for each detected impulse of the set of audio data. The data processing system can identify impulses that the second machine learning model indicates correspond to gunshots or actionable sounds and times of the impulses to determine times of the gunshots. The second machine learning model can be trained based on (e.g., based only on) samples where the gunshot is at the defined time within an audio sample. This configuration can increase accuracy significantly and can provide the precise time of arrival for each gunshot needed for multilateration calculations.

In some cases, the second machine learning model may output an indication that no gunshot was detected, such as when no impulses are detected or when the second machine learning model determines each detected impulse does not correspond to a gunshot. In such cases, the data processing system may discard any indication that the recording device that transmitted the set of audio data and/or the spectrogram from memory.

In some cases, the data processing system may train the machine learning models stored on the recording devices based on the output of the second machine learning model at the data processing system. For example, responsive to the second machine learning model outputting an indication that a spectrogram does not include audio data for a gunshot, the data processing system may transmit an indication to the remote device that transmitted the spectrogram indicating that the spectrogram was inaccurately identified as being associated with a gunshot. Such false detections may occur, for example, when the recording devices record other sudden sounds such as a jackhammer, bus, or a fireworks. The remote computing device may receive the indication and use back-propagation techniques with a loss function to update the weights or parameters of the machine learning model that indicated the audio data or the spectrogram associated with the audio data is associated with a gunshot. The data processing system may operate to train machine learning models of any number of recording devices. In this way, the data processing system may tune each machine learning model to become more accurate over time and learn to ignore new sounds (e.g., new devices or vehicles that may emit or generate sounds that sound like gunshots but are not gunshots) that are introduced into the environment or that are unique to the locations of the recording devices.

In some cases, prior to executing the second machine learning model to detect times of gunshots from the sets of audio data, the data processing system may execute a firework detection machine learning model using the sets of audio data to filter out spectrograms that include audio data of fireworks instead of gunshots. The firework detection machine learning model may be trained as a classification model that indicates whether the spectrograms include sounds of fireworks instead of a gunshot. For example, exploding fireworks may cause recording devices to generate audio data and/or spectrograms from audio data of the fireworks that is similar to the sounds of gunshots. The similarities in sound can cause the recording devices to generate a "false positive" and determine a spectrogram including sounds of fireworks exploding instead includes sounds of gunshots. These determinations can cause the recording devices to send audio data and/or spectrograms of the sound recordings of the exploding fireworks to the data processing system. To filter out spectrograms and/or audio data of exploding fireworks, the data processing system may execute the firework detection machine learning model using the spectrograms for the sets of audio data (e.g., spectrograms that the recording devices send the data processing system and/or spectrograms that the data processing system generates from received audio data) as input. The firework detection machine learning model may output indications of whether the spectrograms are spectrograms of audio data for fireworks or spectrograms of audio data for gunshots. For each spectrogram for which the firework detection machine learning model outputs an indication the spectrogram is of fireworks, the firework detection machine learning model may discard (e.g., remove from memory or a cache of the data processing system) or otherwise flag the spectrogram as being associated with fireworks. The data processing system may not use such spectrograms (e.g., the data processing system may identify the flags associated with the spectrograms and not use the spectrograms based on the identifications) as input into the second machine learning model when determining times of gunshots to minimize processing resources of detecting gunshots and avoid false identifications of gunshots.

The data processing system may additionally transmit an indication to the recording device that transmitted the flagged or discarded spectrogram indicating the recording devices determination that the audio data contained audio data of a gunshot was incorrect. The recording device may receive the indication and train the machine learning model at the recording device using back-propagation techniques based on the indication. Accordingly, the data processing system continuously update the normative data model for data captured at each sensor site.

In some cases, instead of the data processing system filtering out spectrograms based on whether the spectrograms contain audio data of fireworks, the recording devices can locally filter out such spectrograms. For example, the recording devices may each store a firework detection machine learning model similar to the firework detection machine learning model described above. Upon determining a spectrogram is associated with a gunshot, a recording device may execute a firework detection machine learning model with the spectrogram to determine if the determination was a false positive and/or if the spectrogram contains audio data of fireworks instead of a gunshot. If the firework detection machine learning model outputs an indication that the spectrogram is a spectrogram for a gunshot, the recording device may discard the spectrogram and not send the spectrogram or the audio data associated with the spectrogram to the data processing system. Otherwise, the firework detection machine learning model may transmit the spectrogram or the audio data associated with the spectrogram to the data processing system. In this way, the recording devices may avoid sending spectrograms and/or audio data of fireworks to the data processing system, which can lower the bandwidth requirements and/or processing requirements of detecting gunshots at the data processing system.

In step 212, the data processing system may execute a multilateration model using the time of the gunshot for each set of audio data. The data processing system may do so to determine a location of a gunshot. For example, the data processing system may generate a list of groupings of three recording devices from which the data processing system received a set of audio data and/or a spectrogram that the second machine learning model identified at least one time of a gunshot. To generate the list, the data processing system may retrieve the identifications of the recording devices that transmitted the sets of audio data and/or spectrograms from memory and calculate different permutations of three of the recording devices. The data processing system may generate the list as a data structure that includes each permutation of three recording devices and the timestamps of the times in which gunshots that were detected and/or that were selected from the audio data or spectrograms the recording devices transmitted to the data processing system.

The data processing system may execute the multilateration model to cause the multilateration model to calculate a potential location of the gunshot for each grouping of three recording devices. The multilateration model may do so, for example, by applying the following set of equations:

$$(x_s - x_1)^2 + (y_s - y_1)^2 = (r_s - s_1 r_1)^2$$

$$(x_s - x_2)^2 + (y_s - y_2)^2 = (r_s - s_2 r_2)^2$$

$$(x_s - x_3)^2 + (y_s - y_3)^2 = (r_s - s_3 r_3)^2$$

where r is the time difference of arrival, x and y are the coordinates (e.g., the geographic locations), and s is the solution for the variable. In some cases, the data processing system can adjust the equations to take into account atmospheric variables at the time of the gunshot, such as by taking into account temperature, barometric pressure, humidity, and/or wind direction. The data processing system can assume the travel speed of the sound between locations decreases as temperature and/or humidity increases, may be relatively unchanged based on barometric pressure, and/or vary based on wind direction depending on whether the wind is traveling with the sound or against the sound. The detected or selected times of the gunshots and the locations of the recording devices in the groupings of three recording devices may be used as input into the equations.

Upon calculating the potential locations, the multilateration model may iteratively filter out the different groupings of recording devices. For example, the multilateration model may calculate an average gunshot location from the calculated potential gunshot locations of each grouping of three recording devices that detected the gunshot. The multilateration model may then use a distance formula between the potential locations of the gunshot for each grouping of recording devices to calculate distances between the potential locations of the groupings and the average location of all of the groupings. The multilateration model may identify the grouping or a set number of groupings associated with the largest distance or distances and remove the groupings from the list. In some cases, the multilateration model may remove any groupings from the list that are associated with a distance that exceeds a threshold. The multilateration model may then calculate a new average location from the potential locations of the remaining recording devices on the list. The multilateration model may calculate distances between the potential locations and the new average location and remove any groupings of recording devices that are associated with a largest calculated distance or a distance that exceeds a threshold. The multilateration model may repeatedly perform this process until only one grouping of recording devices is left on the list. The multilateration model may identify the potential location of the remaining grouping as the location of the gunshot.

In step 214, the data processing system may transmit an indication of the location to a remote processor (e.g., a second remote processor) of a second remote computing device. The data processing system may transmit the indication of the location by generating a record (e.g., a file, document, table, listing, message, notification, etc.) that includes the indication of the location. The data processing system may transmit the indication of the location as a string identifying the location. In some cases, the data processing system may additionally or instead include a timestamp indicating a time in which one of the three remote computing devices generated audio data for the gunshot. The data processing system may select a time for one (e.g., the earliest time) or all three of the remote computing devices and insert the selected time or times in the record. The data processing system may transmit the record to the remote processor.

Transmitting the indication of the location to the remote processor may cause the remote processor to direct an unmanned vehicle to the location of the gunshot. For example, the remote processor may be configured to control a drone with an attached camera or video camera. The remote processor may receive the location in the record from the data processing system and configure the drone to travel to the location. The drone may drive or fly to the location and capture video or pictures of the location. By doing so, the system may operate to capture evidence or images of the site such that investigators may better piece together the story of why the gunshot was fired and/or who was involved in firing the gunshot.

In one example, the data processing system can control a camera to rotate in the direction of the location of the gunshot. For example, the data processing system can store the locations of different cameras around a municipal area. In some cases, the data processing system can store field of view (e.g., field of view) radii of the different cameras. Upon determining the location of the gunshot, the data processing system can determine if the location is within the field of view of any of the cameras. The data processing system can instead identify the camera that is closest to the location (e.g., identify the location and use a distance function between the location and the locations of the cameras to identify the camera that is closest to the location). The data processing system can determine a location of the gunshot relative to the identified camera based on the geographic data of the location of the gunshot and the geographic location of the camera. The data processing system can control the camera to rotate to the location of the gunshot (e.g., the data processing system can transmit an azimuth, an elevation, and/or global positioning system coordinates to the camera to cause the camera to rotate to the location of the gunshot).

In another example, the data processing system can control a camera to rotate towards a location of a lane of egress. The lanes of egress may be escape routes of individuals who committed a crime, for example. The lanes of egress may be predetermined locations and/or distances relative to a location of a gunshot (e.g., 50 yards away from a location of a gunshot or a predetermined or stored location away from a location of a gunshot). Locations of lanes of egress can be stored in memory of the data processing system as specific geographical locations or functions to determine the geographic locations of the lanes of egress (e.g., identify the geographic location of a lane of egress by aggregating 50 yards in the x direction from the location of the gunshot). The data processing system can retrieve a location of a lane of egress by querying memory using the location of the gunshot as an index. Upon retrieving the location from memory, the data processing system can identify a camera that corresponds to the location of the gunshot (e.g., that has a stored association with a radius that includes the location of the gunshot) and/or the location of the lane of egress (e.g., that has a stored association with a radius that includes the location of the lane of egress). The data processing system can determine the location of the lane of egress by executing a stored function based on the location of the gunshot. The data processing system can control the camera to rotate towards the location of the lane of egress. Accordingly, the data processing system can control the camera to capture video of potential escape routes of individuals that may have just committed a crime.

In some cases, the data processing system can gather (or generate) training data to train the second machine learning model using the multilateration technique. For example, a problem that may arise when training the second machine learning model to determine times of gunshots (or other types of sounds) from audio data is that there may be a large number of sets of audio data available that are gathered or generated from sensors or microphones that are close to the gunshots, but less audio data that is available from sensors or microphones that are far away from gunshots. This difference in training data between close gunshots and gunshots that are further away when detected may cause the second machine learning model to be trained to more reliably determine if an audio sample includes a gunshot (or other actionable sound) or not.

The data processing system can gather training data of gunshot sounds that are further away. The data processing system can do so using the multilateration techniques described herein. For example, the data processing system can use the techniques described herein to determine times in which gunshots were detected at different recording devices and the locations of the detected gunshots. The data processing system can determine a time (e.g., a precise time) in which each gunshot occurred, such as by determining a distance between the location and a location of one of the sensors or microphones (e.g., of recording devices) and using the following equation:

$$T_{shot} = t_{arrival\ time\ at\ sensor} - (d_{distance\ between\ sensor\ and\ location\ of\ gunshot} / v_{speed\ of\ sound}).$$

In some cases, the data processing system can adjust $v_{speed\ of\ sound}$ based on environmental factors at the time of the gunshot, such as temperature, humidity, and air pressure. For instance, $v_{speed\ of\ sound}$ can increase with higher temperatures, increase with higher humidity, and/or vary based on wind factors depending on whether the wind is going against the sound or with the sound.

The data processing system can use the determined time and location of the gunshot to determine expected times in which sounds of the gunshot will reach different locations in the environment or area around the location. For instance, the data processing system can multiply the speed of sound by distances, or the speed of sound adjusted based on environmental factors, between the location of the gunshot and different locations in the area surrounding the gunshot to determine amounts of time it will take for sounds of the gunshot to reach the locations after the time of the gunshot. The data processing system can add the determined amounts of time to the time of the gunshot to determine the times at which the sound of the gunshot will reach the different locations.

The data processing system can use the determined times at which the sound of the gunshot will reach the locations to train the second machine learning model to determine times of gunshots from audio data. For example, the data processing system can use the above-described techniques to determine times at which a sound of a gunshot should have reached the locations of different recording devices. The data processing system can identify a segment of audio data (e.g., the sounds of the audio data and/or a spectrogram from the audio data) from time frames that include the times at which the sounds of the gunshot should have reached the locations of the respective recording devices (e.g., the times at which the recording devices should have detected the sounds of the gunshot). The data processing system can label segments of audio data with the determined times at which the sounds of the gunshot should have reached the locations of the respective recording devices. The data processing system can train the second machine learning model to detect times or impulses of sounds of gunshots from the labeled segments of audio data using unsupervised, semi-supervised, or supervised learning techniques, such as by using back-propagation techniques. By training the second machine learning model in this way, the data processing system can train the second machine learning model to more accurately detect sounds of gunshots in audio data from recording devices that are further away from the gunshots. For instance, the data processing system can create a training dataset that includes more data for recording devices that are located further from gunshots when detecting the gunshots. The data processing system can use the training dataset to train the second machine learning model to more accurately identify impulses of gunshots that are further away from the recording devices, such as when the impulses are lower as a result of the impulses corresponding to sounds of the gunshots being softer because the recording devices detecting the gunshots are further away.

In some cases, in addition to or instead of using multilateration techniques to train the second machine learning model stored by the data processing system to determine times of gunshots, the data processing system can train the first machine learning models stored on the recording devices to detect segments of audio data that contain sounds of gunshots. For example, the data processing system can use determined times at which different recording computing devices should have detected sounds of gunshots. The data processing system can identify segments of audio data containing sounds at the determined times. The data processing system can label the identified segments of audio data as containing a sound of a gunshot. The data processing system can then use a supervised, semi-supervised, or unsupervised learning technique to train the first machine learning models stored on the recording computing devices to detect segments of audio data that contain at least one sound of a gunshot, such as by using back-propagation techniques. In this way, the data processing system can train first machine learning models executing on the recording devices to detect segments of audio data containing at least one sound of a gunshot, such as when the recording devices are further away from the gunshots.

In some cases, the data processing system can execute a third machine learning model to determine a number of guns and/or individual types of guns that are firing within a defined time period. For example, the data processing system can store the third machine learning model in memory. The third machine learning model can be configured to generate signatures of individual guns. The signatures can be or include audio signatures or vectors of values (e.g., gun fingerprints) that the third machine learning model generates based on sets of audio data (e.g., sets of audio data that the data processing system receives from different recording devices that detect sets of audio data that contain sounds of gunshots or other actionable sounds). To generate the signatures of the individual guns, the data processing system can load and preprocess the individual sets of audio data, ensuring uniform sample rates and normalization across all audio files. The data processing system can convert or transform sets of audio data that are not already spectrograms into spectrograms, such as by using the Short-Time Fourier Transform (STFT). The data processing system can extract audio features from the spectrogram, such as Mel-Frequency Cepstral Coefficients (MFCCs), chroma features, zero-crossing rates, and/or spectral centroids. The data processing system can combine such features extracted from a set of audio data into a feature vector. The data processing system can execute the third machine learning model (e.g., a neural network), such as an autoencoder, to compress these feature vectors into a lower-dimensional latent space representation, which can be the audio signature. The autoencoder can include an input layer that receives the feature vector, an encoding layer that reduces the dimensionality to generate the signature, and a decoding layer that reconstructs the original feature vector. The data processing system can normalize the generated signatures and store the signatures in a database for efficient retrieval and comparison.

The data processing system can use the generated signatures to determine a number of guns that fired gunshots (e.g., that participated in a firefight). The data processing system can generate a signature for each set of audio data that the data processing system receives from individual recording devices and/or for which each set of audio data that the data processing system both receives and determines a timestamp indicating a time in which the gunshot was detected. The data processing system can store the signatures in a database in memory. The data processing system can identify signatures for sets of audio data containing a time within a defined time period (e.g., a defined time after a first detected time of a gunshot, a defined time starting with the first detected time and ending a time after a last detected time and there a defined amount of space after the last detected time, etc.). The data processing system can identify the number of unique signatures within the compared signatures. The data processing system can maintain and increment a counter for each unique signature to determine the number of guns that fired gunshots within the defined time period. The data processing system can generate a record indicating the number of guns for the defined time period and store the record in memory. Accordingly, the data processing system can retrieve the number upon receiving a query for the number of guns to display on a user interface, such as at a remote computing device or a client computing device. In some cases, the data processing system can generate a record or data structure for each individual gun or signature and update the record for each set of audio data or gunshot for which the signature was detected and/or any other data about the gunshot, such as a determined location for the gunshot, a time of the gunshot, etc.

In some cases, the data processing system can identify the types of the guns that fired the detected gunshots. The data processing system can do so using the signatures the data processing system generates from sets of audio data. For instance, the data processing system can store sets of features for different types of guns in a database or in memory. The data processing system can compare the signatures that the data processing system generates for sets of audio data with the sets of features. The data processing system can determine the types of guns that fired the gunshots based on a similarity between the signatures and a set of features for a particular type of gun. For example, the data processing system can determine a particular type of gun fired a shot based on a signature generated from a set of audio data containing each feature as the stored set of features for the type of gun or based on a threshold number of features matching or being within a threshold distance of each other. The data processing system can assign types of guns to individual signatures based on the determinations. The data processing system can determine the counts of the number of types of guns that fired within a defined time period (e.g., a defined time after a first detected time of a gunshot, a defined time starting with the first detected time and ending a time after a last detected time and there a defined amount of space after the last detected time, etc.) such as by maintaining and incrementing a counter for each unique type of gun for which the data processing system identified a corresponding signature from a set of audio data generated within the defined time period. The data processing system can generate a record indicating the number of types of guns, and/or identifications of the types of guns themselves, for each defined time period and store the record in memory. In some cases, the data processing system can include numbers of types of guns, and/or the identifications of the types of guns, in the record containing the count of the number of guns for the defined time period. Accordingly, the data processing system can retrieve the number upon receiving a query for the number of types of guns to display on a user interface, such as at a remote computing device or a client computing device.

In some cases, the data processing system can use signatures generated from sets of audio data to determine other characteristics of the guns firing the gunshots and/or the gunshots themselves. For example, using the signatures the data processing system generates from sets of audio data, the data processing system can determine a firing rate of the individual guns. The data processing system can do so, for example, by detecting sets of audio data from separate gunshots that contain the same signature. The data processing system can compare the determined times of the gunshots to determine the differences between the determined times, or a frequency of the gunshots. The data processing system can compare the differences and/or frequencies to templates that correspond to different firing rates, such as single action, semi-automatic, and/or fully automatic to determine firing rates for the gunshots. The data processing system can determine such firing rates for the signatures and/or gunshots and store indications of the determinations in records for the gunshots and/or signatures for the guns that generated the gunshots.

In another example, the data processing system can determine the caliber of rounds that are fired in the gunshots. For example, the data processing system can determine signatures of sets of audio data determined to correspond to gunshots as described above. The data processing system can determine a distance a recording device that generated the set of audio data is from the gunshot by determining the location of the gunshot using the techniques described herein and determining a distance between the recording device and the location of the gunshot, such as by using a distance formula. The data processing system can determine a depreciation of energy over the distance based on atmospheric conditions (e.g., temperature, humidity, and/or wind speed) at the time of the gunshot, which may be detected using sensors or by otherwise receiving the conditions from an external data source. The data processing system can use an energy depreciation equation to determine the depreciation of the energy over the distance such as, for example:

$$E(d) = E_0 \cdot \left(e^{-\alpha d} / d^2\right)$$

where E(d) is the energy at distance d, $E_0$ is the initial energy at the source, and α is the atmospheric absorption coefficient, which depends on factors such as frequency of the sound, temperature, humidity, and atmospheric pressure. The data processing system can determine $E_0$ based on a mapping between the type of gun that corresponds to the signature of the gunshot in memory. The data processing system can determine the amount of energy depreciation or the energy depreciation rate of the gunshot from the source of the gunshot using the equation. The data processing system can compare one or more of the signature, the amount of energy depreciation, or the energy depreciation rate, to a mapping stored in memory to determine a caliber of the bullet fired in the gunshot. The data processing system can store the determined caliber in the record for the gunshot or the signature for the gun that fired the gunshot.

Figure 3:
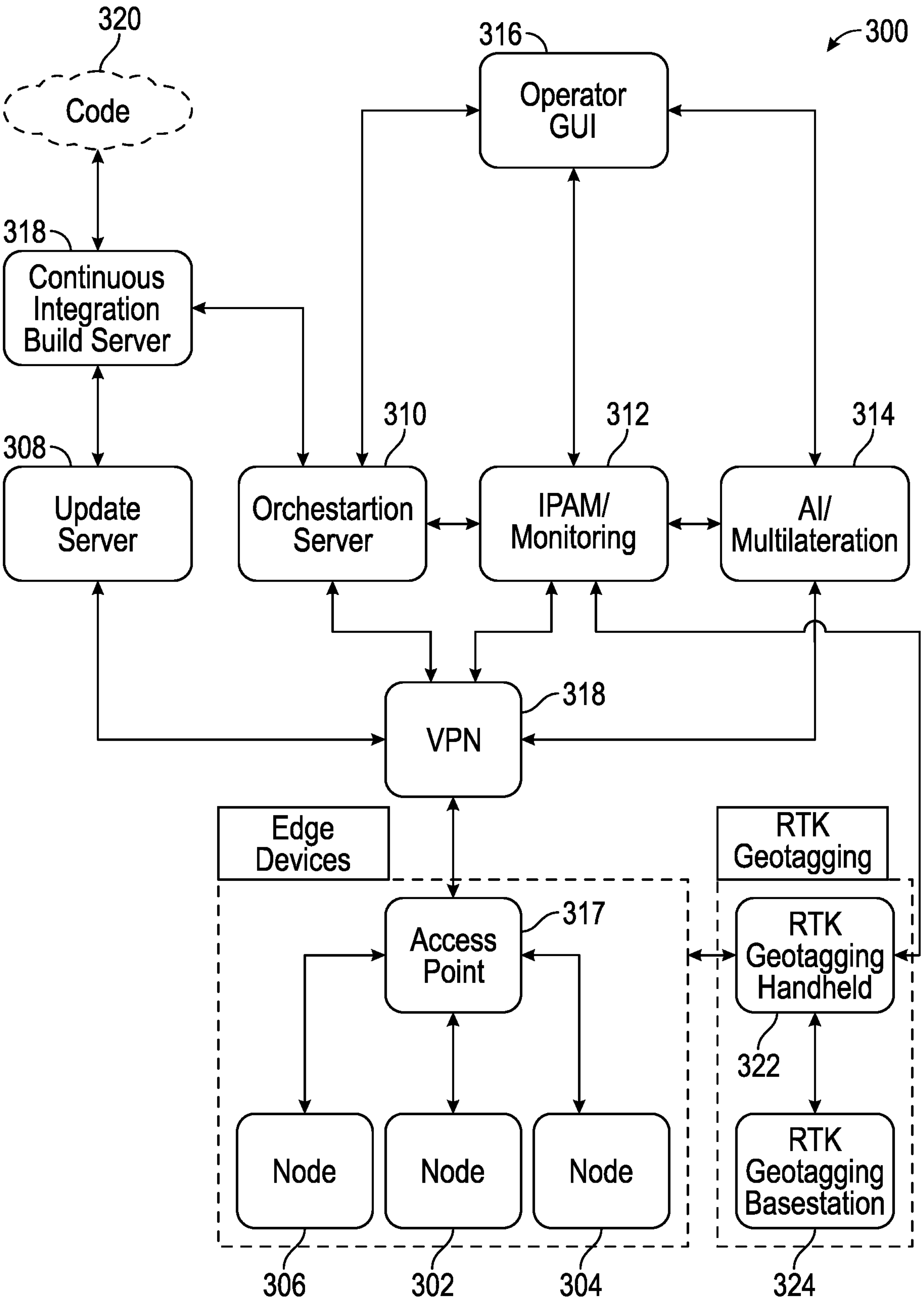
FIG. 3 is a sequence diagram of a sequence for gunshot detection, according to an embodiment.

FIG. 3 is a sequence diagram of a sequence 300 for gunshot detection, according to an embodiment. The sequence 300 may be performed by any number of components, such as components of the gunshot detection system 100, shown and described with reference to FIG. 1. In the sequence 300, recording devices 302, 304, and 306 (e.g., the recording devices 120) may operate together to generate audio data of sound waves from the surrounding environment (e.g., a metropolitan area). The recording devices 302, 304, and 306 may identify sets of audio data that contain audio of gunshots and transmit the audio data (e.g., transmit spectrograms of the audio data) to an update server 308, an orchestration server 310, an IP address management (IPAM)/monitoring server 312, and/or an artificial intelligence/multilateration server 314. Together, the orchestration server 310, the IPAM/monitoring server 312, and/or the artificial intelligence/multilateration server 314 may be or include the analytics server 110*a*. The recording devices 302, 304, and 306 may transmit the audio data and/or spectrograms through an access point 317 and a virtual private network (VPN) 318. The update server 308, orchestration server 310, IPAM/monitoring server 312, and/or artificial intelligence/multilateration server 314 may operate together to perform the method 200 to detect locations and/or times of gunshots around a particular area from audio data and/or spectrograms the update server 308, orchestration server 310, IPAM/monitoring server 312, and/or artificial intelligence/multilateration server 314 receive from the recording devices 302, 304, and 306.

An operator can access the orchestration server 310, the IPAM/monitoring server 312, and/or the artificial intelligence/multilateration server 314 via an operator graphical user interface 316. In operating the servers 310, 312, and 314, the operator can configure the servers 310, 312, and 314 to operate to detect gunshots. For instance, the operator can change the configuration of the artificial intelligence model (e.g., the second machine learning model and/or the firework detection machine learning model) and/or a multilateration model of the artificial intelligence/multilateration server 314 to select specific potential gunshots from spectrograms to use for multilateration. The graphical user interface 316 may illustrate the locations of gunshots on a map with other relevant information (e.g., the time of the gunshot). The graphical user interface 316 may integrate with emergency response software such that a user may operate the graphical user interface 316 to transmit a message to a server of an emergency response team (e.g., authorities) indicating the gunshot occurred and/or the location of the gunshot.

The artificial intelligence/multilateration server 314 may identify specific times of the gunshots from impulses in spectrograms. The artificial intelligence/multilateration server 314 may be configured to identify coordinates of the recording devices 302-306 and the corresponding times of arrival of the gunshot sounds the recording devices record and output a location of gunshot using a multilateration model based on the coordinates and the times of arrival.

The IPAM/monitoring server 312 may control how often the IPAM/monitoring server 312 requests data from the recording devices 302-306. The IPAM/monitoring server 312 may also store of the locations of the recording devices 302-306. In one example, the IPAM/monitoring server 312 may store geolocation data of the recording devices 302-306.

The code 318 and the continuous integration build server 320 may operate to continuously update the update server 308 and the orchestration server 310 for performance maintenance and improvements. For example, the code 318 may be configured or written by a programmer and the continuous integration build server 320 may propagate updates through the update server 308 to ensure the recording devices 302-306 are configured with the same settings. The orchestration server 310 may provision servers so the server can be reliably burned down and rebuilt. Additionally, the orchestration server 310 can interact with the recording devices 302-306 individually or together.

In some cases, the update server 308 may store a copy of the machine learning model that is stored locally at the recording devices 302-306 and train the copy of the machine learning model over time. The update server 308 may do so, for example, by training the copy with new sounds of new devices (e.g., a jackhammer) that may become available or located at the locations of the recording devices 302-306. The update server 308 may train the machine learning model and transmit files (e.g., binary files) containing the machine learning model to the recording devices to update the machine learning models that are stored locally at the recording devices 302-306.

The recording devices 302-306 may be tagged (e.g., geotagged) using RTK geotagging techniques. For example, an RTK geotagging handheld device 322 may communicate with an RTK geotagging basestation 324 to detect the location of the recording devices 302-306. The RTK geotagging handheld device 322 and the RTK geotagging basestation 324 may do so by assigning locations to the recording devices 302-306 upon installation. Barcodes (e.g., substantially weatherproof stickers containing barcodes) may be attached to the recording devices 302-306. The RTK geotagging handheld device 322 may scan the barcodes and enter the barcodes into a database. The RTK geotagging handheld device 322 may communicate with the RTK geotagging basestation 324 to determine the current location (e.g., coordinates) of the RTK geotagging handheld device 322 and, thus, the respective recording devices 302-306. The RTK geotagging handheld device 322 may store the locations of the recording devices 302-306 in memory and/or in memory of the IPAM/monitoring server 312 such that the locations may be retrieved and used to locate gunshots as described herein.

Figure 4:
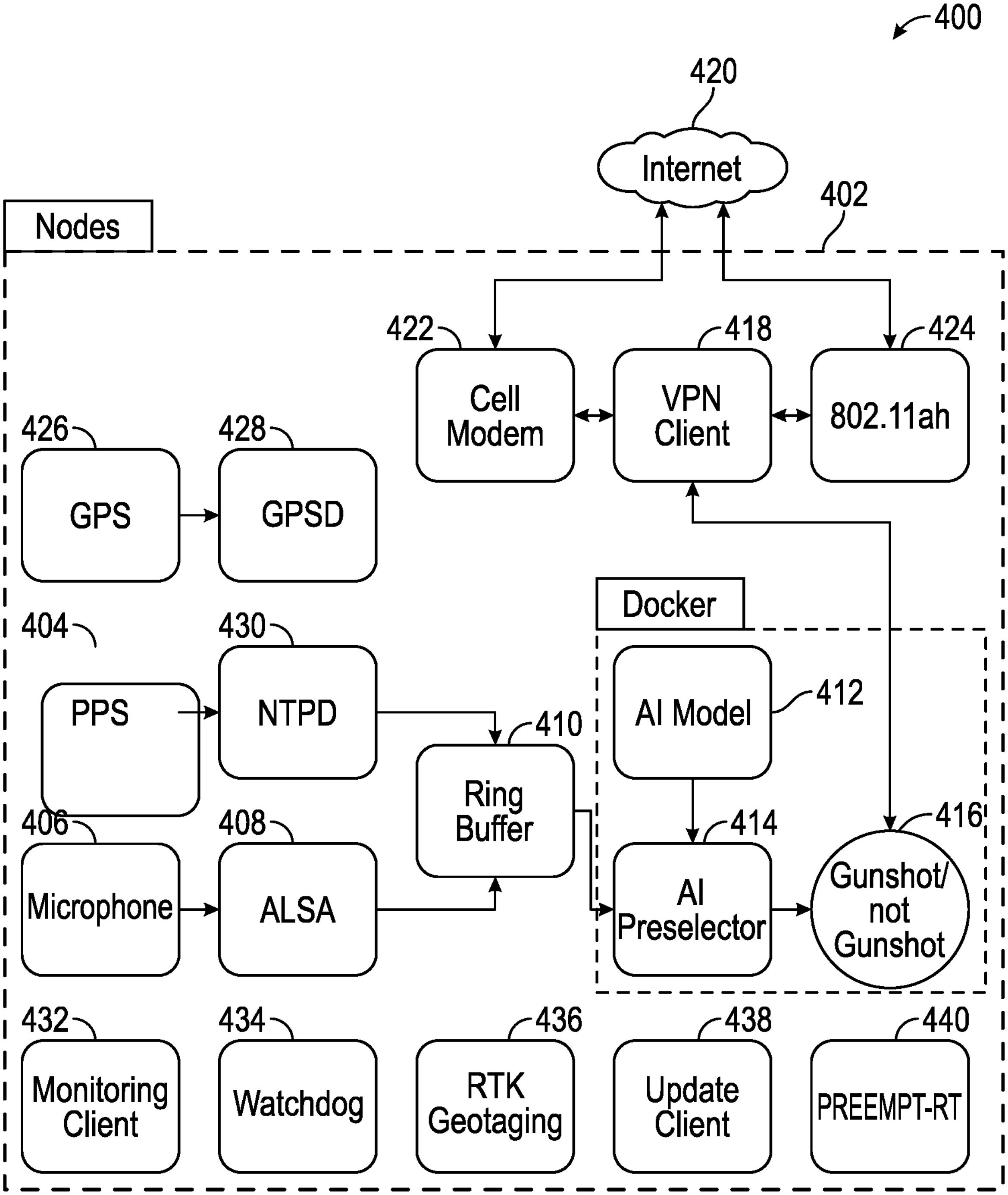
FIG. 4 is another sequence diagram of a sequence for gunshot detection, according to an embodiment.

FIG. 4 is a sequence diagram of a sequence 400 for gunshot detection, according to an embodiment. The sequence 400 may be performed by any number of components, such as the components of the gunshot detection system 100, shown and described with reference to FIG. 1 or 3. For example, in the sequence 400, a recording device 402 (e.g., a recording device 120, or one of the recording devices 302, 304, and 306) can operate to record sounds of the environment surrounding the recording device 402. The recording device 402 may transmit pulses in a pulse per second (PPS) configuration 404 to every device of the gunshot detection system 100 and/or described with reference to the sequence 300.

A microphone 406 may include one or more microphones that capture sound waves from the environment and convert the soundwaves to audio data. The microphone 406 may transmit the audio data to an advanced Advanced Linus Sound Architecture (ALSA) driver 408. The ALSA driver 408 may increase the gain on the microphone 406. A ring buffer 410 of the recording device 402 may continually generate audio samples (e.g., sets of audio data) with or without overlap from the audio data the ring buffer receives from the ALSA driver 408. In cases in which there is overlap between the samples, there may be a trade off between response time and processing load because the audio data of the overlap is processed twice. The ring buffer 410 may additionally timestamp the audio to indicate the times in which the audio was received (e.g., times of arrival). The timestamps may be used for artificial intelligence classification to detect gunshots from the audio as described herein.

An artificial intelligence (AI) model 412 of the recording device 402 may analyze the sample sets of data that the ring buffer 410 generates. To do so, an AI preselector 414 of the recording device 402 may preprocess the samples of audio data into discrete spectrograms such that the audio data can be processed with image processing techniques. The AI model 412 may use image processing techniques on the spectrograms the AI preselector 414 generated or otherwise received to detect spectrograms that may include audio data of gunshots. In doing so, the AI model 412 may determine identifications 416 of whether the spectrograms include audio data of gunshots or not. The recording device 402 may transmit, through a VPN client 418 and over a network 420, spectrograms and/or audio data that was used to generate such spectrograms to a server (e.g., the analytics server **110*a* or the artificial intelligence/multilateration server 314) that the recording device 402** determined are associated with gunshots.

The server may query nearby recording devices (e.g., recording devices within a threshold distance of the recording device 402) for sets of audio data and/or spectrograms of such sets of audio data that were generated concurrently or within a threshold (e.g., a defined time threshold) of a time (e.g., a beginning, end time, or a time between the beginning and end time) of the set of audio data from which the gunshot was originally detected at the recording device 402. The server may do so by including a timestamp of the time in the query. In response to the query, the queried recording devices may identify sets of audio data and/or spectrograms of sets of audio data that contain audio from the time and transmit the sets of audio data and/or spectrograms to the server for gunshot detection from each set of audio data and/or spectrogram. In some cases, the queried recording devices may first determine which of the spectrograms or sets of audio data contain audio data of a gunshot and only transmit spectrograms and/or sets of audio data the recording devices determined are associated with gunshots. In some cases, the queried recording devices may transmit all sets of audio data and/or recording devices that contain audio data from the time in the query.

The recording device 402 may communicate with other recording devices and/or the network using a variety of communication techniques. For example, the recording device 402 may include a cell modem 422 that connects the recording device 402 to the network 420. In another example, the recording device 402 may include a wireless communication interface 424, such as 802.11ah. The recording device 402 may transmit and receive messages from other recording devices via the wireless communication interface 424. For instance, the recording device 402 may receive audio data and/or spectrograms from other recording devices of a mesh network of which the recording device 402 is a part. The recording device 402 may transmit the received spectrogram and/or audio data to a server for processing via the cell modem 422 and through the network 420.

The recording device 402 may additionally include other components. For instance, the recording device 402 may include a GPS 426, a GPSD 428, an NTPD 430, a monitoring client 432, a watchdog circuit 434, an RTK geotag 436, an update client 438, and/or a preempt-RT 440. The GPS 426 may be a global positioning system that enables the recording device 402 to determine a current time at the location of the recording device 402. The GPS 426 may transmit the determined current time to the GPSD 428, which can communicate the data to a server (e.g., the analytics server **110*a*) to indicate the current time. The NTPD 430 may be an operating system daemon which synchronizes the time and day with a time and day stored on a network. The recording device 402 may retrieve the synchronized time and data for samples of audio data to label the audio data. The monitoring client 432 may communicate with a monitoring server (e.g., may be an application programming interface that enables communication with the monitoring server), enabling the monitoring server to communicate with and/or retrieve data from the recording device 402. The watchdog circuit 434 may automatically reset the processor of the recording device 402 upon determining the processor is unresponsive. The watchdog circuit 434 may operate in the background. The watchdog circuit 434 may perform a hard power cycle the recording device 402 if the recording device 402 becomes unreachable. In some cases, three reboots without successfully establishing a connection with the network 420 may cause the watchdog circuit 434 to revert the recording device 402 to a previous update. The RTK geotagging 436 may be a geographical tag identifying the geographical location of the recording device 402 (which may be determined upon installation of the recording device 402 based on GPS data of an RTK tagging device that is present during installation). The recording device 402 may store the geographical tag of the RTK geotagging 436 in memory. The update client 438 may be an application programming interface (API) that facilitates communication with an update server to receive updates for the software or firmware of the recording device 402. The preempt-RT 440 may enable the recording device 402 to run special real-time tasks and interrupt handlers. The preempt-RT 440** may further make interrupts as threads.

Figure 5:
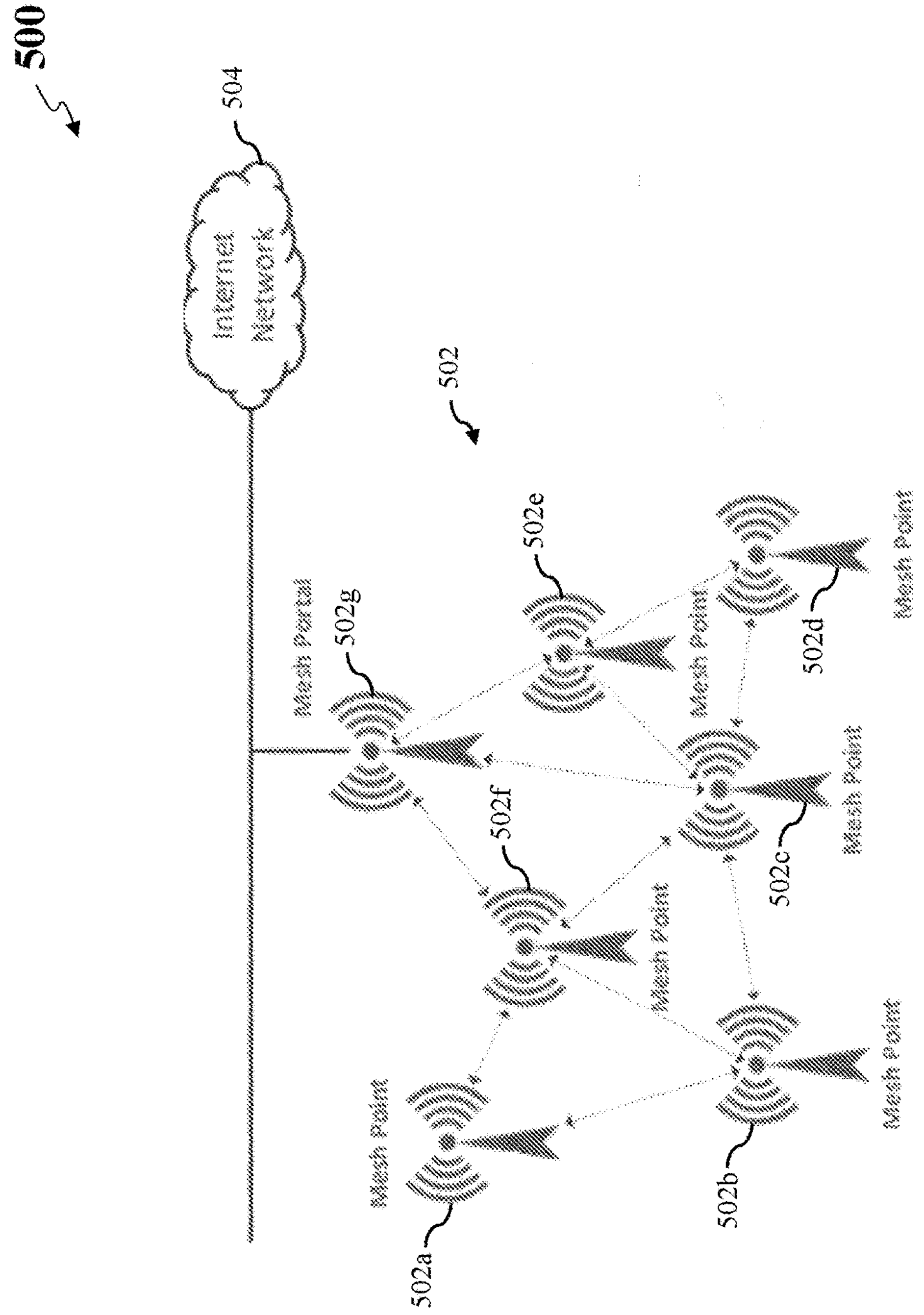
FIG. 5 is an illustration of a network mesh of a gunshot detection system, according to an embodiment.

FIG. 5 is an illustration of a network mesh 500 for a gunshot detection system, according to an embodiment. The network mesh 500 may include multiple recording devices 502*a-g* (collectively, recording devices 502 and individually, recording device 502) (e.g., the recording devices 120) that are distributed around a metropolitan area. The recording devices 502 in the network mesh 500 may communicate with each other (e.g., communicate via 802.11ah). A recording device of the recording devices 502 can include a modem (e.g., a cell modem) that connects the recording device to a network 504. Any number of the recording devices can include such a modem. The recording devices 502 can transmit messages to each other in paths to reach a recording device that includes a modem or a modem that has an established connection with a server through the network 504. The recording device including such a modem may transmit the received data to the server for further processing. For example, upon determining audio data includes audio data of a gunshot, a recording device can transmit the audio data through a sequence of recording devices to reach a recording device with a modem so the recording device with the modem can transmit the audio data to a server to determine the time of the gunshot, as described herein.

In some cases, each of the recording devices 502 may include both a modem to directly connect to the network 504 and a Wi-Fi interface to communicate with each other. To minimize the number of recording devices 502 that communicate through the network 504, only one recording device 502 may operate a modem and the other recording devices 502 may communicate with the one recording device 502 to transmit audio data and/or spectrograms through the network 504. However, if a recording device 502 is not able to establish a connection with any other recording devices 502, the recording device 502 may activate the modem within the recording device 502 to communicate directly through the network 504 (e.g., transmit audio data and/or spectrograms directly to the network).

Figure 6:
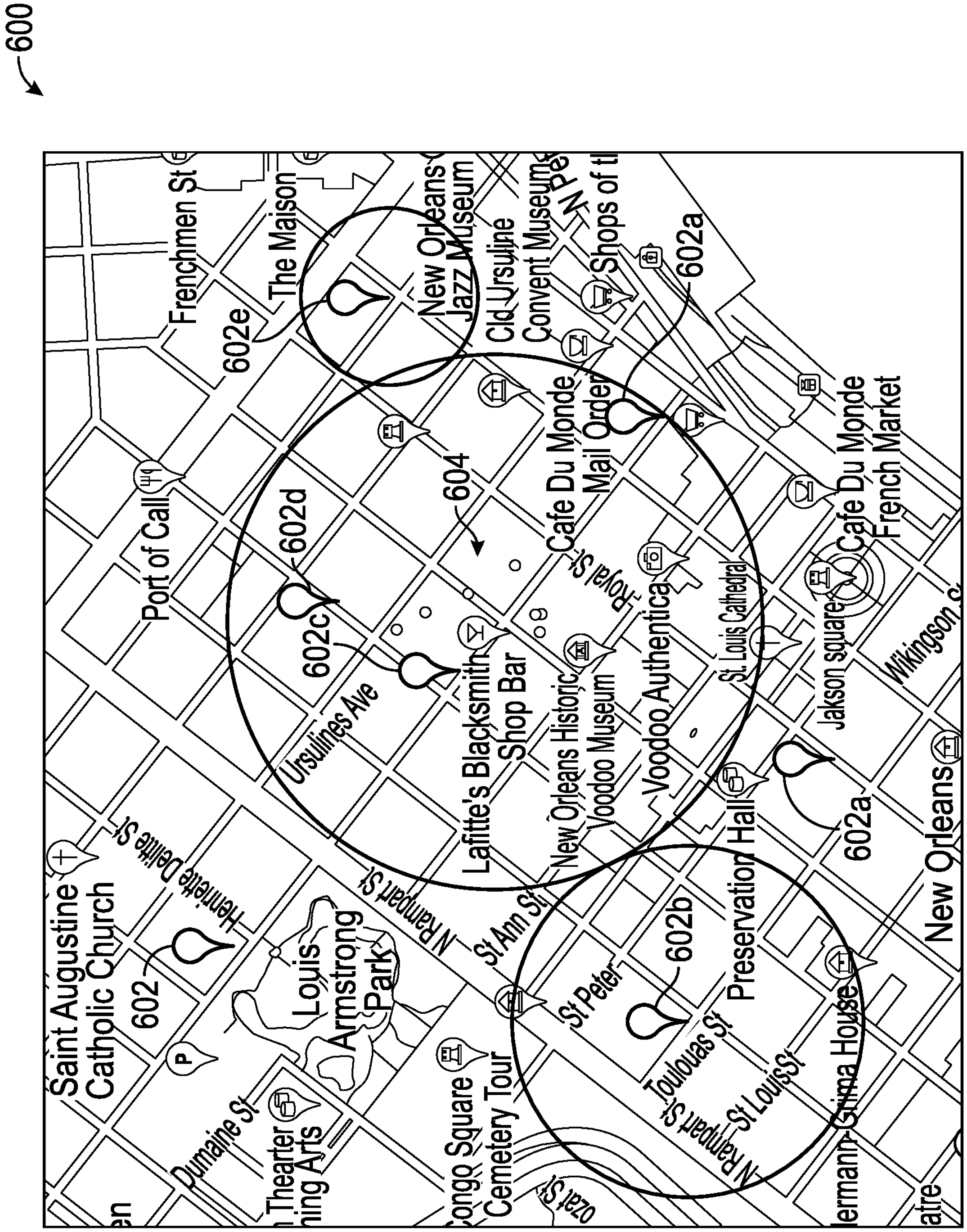
FIG. 6 is an illustration of locations of recording devices of a gunshot detection system within a metropolitan area, according to an embodiment.

FIG. 6 is an illustration 600 of locations of recording devices of a gunshot detection system within a metropolitan area (e.g., a city), according to an embodiment. The illustration 600 may be a graphical user interface presented on a screen of a computing device. Multiple locations 602*a-f* (together locations 602) of recording devices (e.g., recording devices 120) are marked in the illustration 600. The illustration 600 also includes potential gunshot locations 604 of a gunshot for various permutations of the recording devices that generated audio data for the gunshot. The potential gunshot locations 604 may be calculated based on times the recording devices generated audio data of the gunshot and/or the locations 602 of the recording devices. The potential gunshot locations 604 may be used in a multilateration technique to calculate or determine the actual location of the gunshot.

Figure 7:
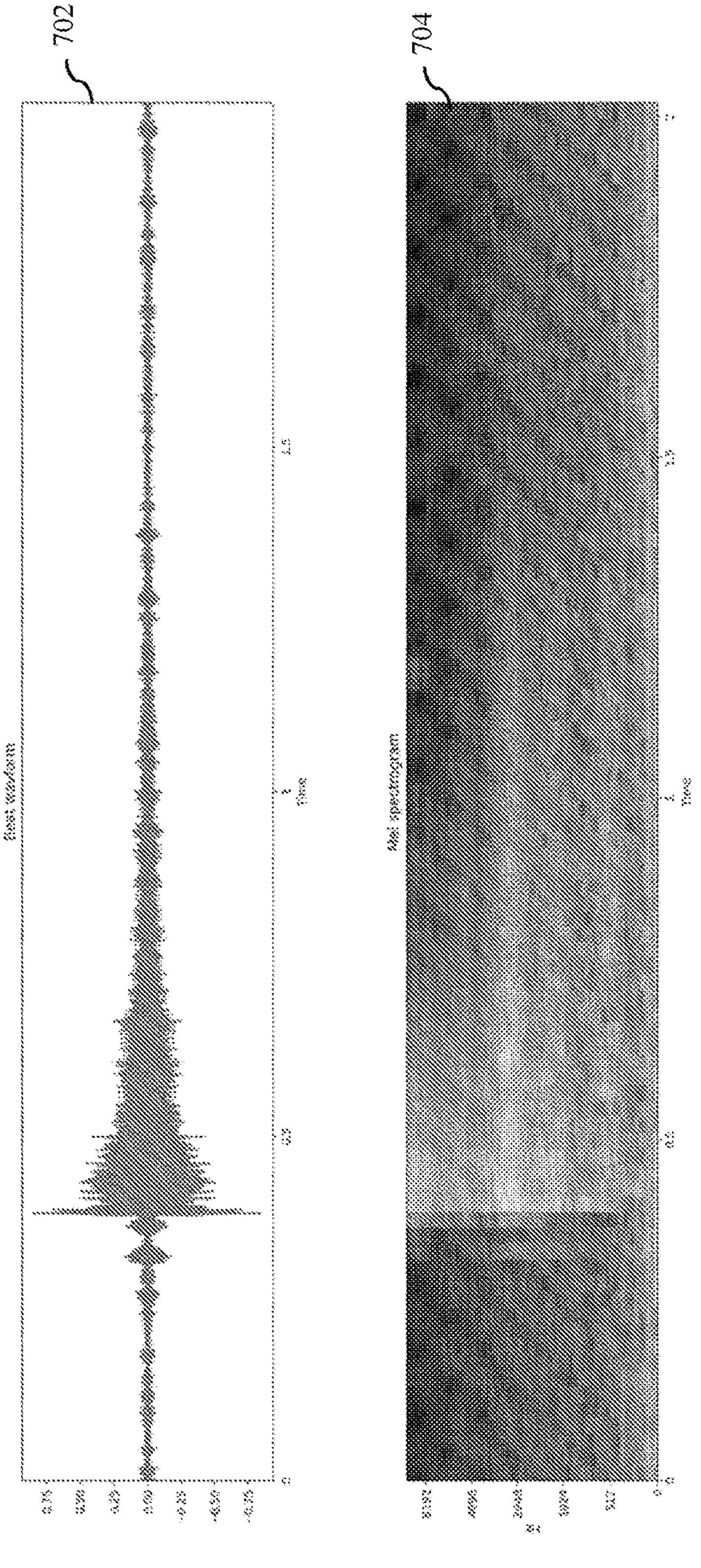
FIG. 7 illustrates depictions of a set of audio data, according to an embodiment.

FIG. 7 illustrates a depictions 700 of a set of audio data (e.g., a sample of audio data), according to an embodiment. The depictions 700 may include a beat waveform 702 and a spectrogram 704. The beat waveform 702 may illustrate a detected soundwave over time. The spectrogram 704 may illustrate frequencies of the detected soundwave over time. The machine learning models described herein may use image recognition techniques on illustrations such as the beat waveform 702 and the spectrogram 704 to detect, in the case of recording devices (e.g., recording devices 120), whether the illustrations illustrate audio data for at least one gunshot, and/or, in the case of a server (e.g., the analytics server 110*a*) times of one or more gunshots. References to generating and processing spectrograms herein may be references to generating and processing other visual representations of sound waves, such as the beat waveform 702.

Figure 8:
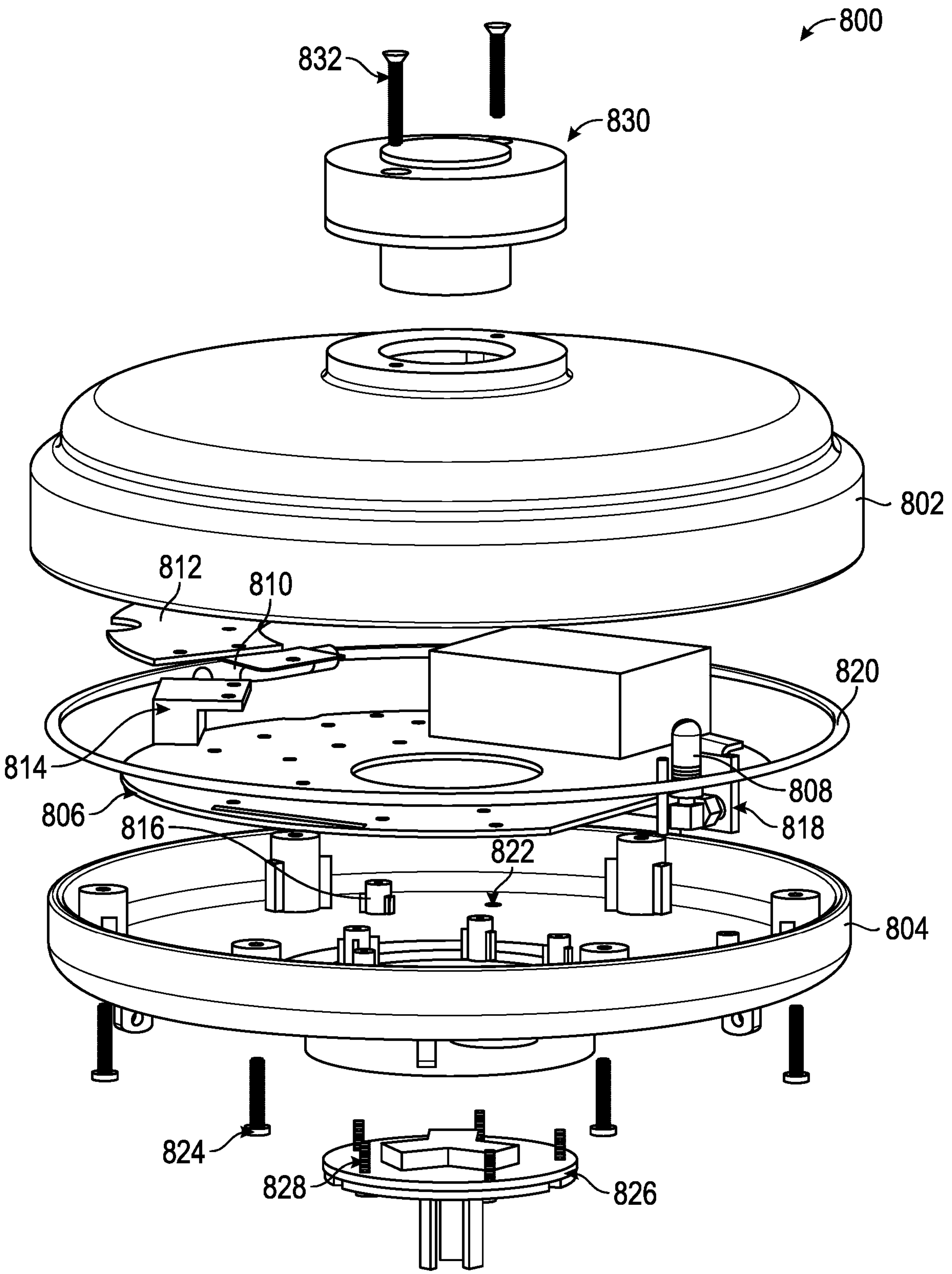
FIG. 8 illustrates a housing for a recording device, according to an embodiment.

FIG. 8 illustrates a housing 800 for a recording device, according to an embodiment. The housing 800 can be a housing for a recording device (e.g., the recording device 120). The housing 800 may be configured to removably couple with light fixtures (e.g., light fixtures attached or coupled with light posts (e.g., light posts 125)) around a metropolitan area. In one example, the housing 800 can be configured such that a microphone, a communications interface, and/or a processor can be mounted in or on the housing 800. The housing 800 can also be configured such that the housing 800 can be coupled to or with a light post. For example, the housing 800 may use a twist lock plug and socket system into an opening or receptacle of a light post. Because of this configuration, the housing 800 (and thus the recording device itself) may be quickly installed throughout a metropolitan area to existing light posts instead of requiring construction of new structures that can hold each recording device.

The housing 800 may include a top enclosure 802 and a bottom enclosure 804. The top enclosure 802 and the bottom enclosure 804 can house a printed circuit board (PCB) 806. The PCB 806 can include a processor or other computer that is configured to receive and process audio data from a microphone. An antenna 808, a thermal switch 810, a heater mounting plate 812, and/or a positive temperature coefficient (PTC) heater 814 can be mounted to the PCB 806. The PCB 806 can be mounted to the top enclosure 802 and the bottom enclosure 804 with posts 816, a three dimensional printed bracket 818, and an O-ring 820. A WI-FI mesh 822 may also be coupled to the top enclosure 802 and/or the bottom enclosure 804. The PCB 806 can be mounted between the top enclosure 802 and the bottom enclosure 804 by screws 824 or other fasteners. Additionally, a plug 826 can be mounted or attached to the bottom enclosure 804 with screws 828. The plug 826 may connect the electrical components inside the housing 800 with a light fixture (e.g., a light fixture attached or couple to a light post) to power the electrical components. Additionally, a receptacle 830 can be mounted or attached to the top enclosure 802 with screws 832. The receptacle 830 can be configured to hold or store a light (e.g., a photoelectric lightbulb) and may enable the light to connect with the plug 826. Accordingly, during installation, an operator may replace a light bulb in a light post with the housing 800 and place the light in the receptacle 830 to provide the light post with sound detection capabilities in addition to lighting capabilities. The plug 826 of the bottom enclosure 804 can be configured to be fastened to a light fixture as a twist-lock fastening system.

The plug 826 may be configured to physically match plugs of photocells that are connected to light fixtures. For example, the plug 826 may have a twist-lock fastening configuration similar to a photocell that can fasten the housing 800 to a light fixture in place of the photocell. The top enclosure 802 may be configured to receive photocells with configurations similar to the plug 826 (e.g., receive the photocell at an opposite end of the housing 800, such as at an external face of the top enclosure 802. Accordingly, when the housing 800 is deployed to be attached to light fixtures, a user may unplug a photocell from a light fixture and replace the photocell with the plug 826. The user may then plug in the replaced photocell to the receptacle 830 on top of the top enclosure 802. In this way, the housing 800 and the electronics enclosed within the housing 800 may be coupled with light fixtures using the existing structure of the light fixtures, enabling faster and easier installation compared with enclosures that require construction of new structures.

The housing 800 can include a series of mounting brackets 834 extending from or coupled to a bottom of the bottom enclosure 804. Once the housing 800 is installed above a light fixture, a safety cable can be threaded through holes in the mounting brackets 834 and around the arm supporting the light fixture in a manner that can allow the safety cable to keep tension on a twist-lock plug engagement to the socket on the top of the light fixture. This configuration can serve to keep the housing 800 in place as well as to prevent the housing 800 from falling to the ground should the housing 800 become separated from the light fixture. The cable can be threaded through one or more of the mounting brackets 834 to resist counter-clockwise turning and/or that may cause electrical disconnection. The cable can be coupled to a sensor to prevent the sensor from becoming dislodged from an outlet.

The housing 800 can configured to have environmental protections. For example, the outer edge of the housing 800 can form a drip edge. The drip edge can limit water flow across the bottom of the housing 800 which could detract from the sensing abilities as well as slip through an electrical seal at the fixture connection based on persistent exposure. An extended ring/ridge around the sensor (e.g., microphone) inside or mounted to the housing 800 can create another drip edge and barrier protecting the opening to the sensor. A ring extending from the bottom enclosure 804 around the plug 826 (e.g., the twist-lock plug) can serve as another barrier to water infiltration into the electrical connection. Specialized membranes designed to protect the sensor (microphone) from water but allow the passage of a gas with negligible degradation of the acoustic waveform can cover the entrance to the housings of both devices. The top enclosure 802 and the bottom enclosure 804 can be designed to provide advanced weather resistance by protecting the scaling surfaces from direct exposure to driven rain and spray. The O-ring 820 can also be used to seal the enclosures 802 and 804.

The housing 800 can be configured to improve audio detection by the sensors (e.g., microphone 406). For example, the housing 800 can include specialized isolation using micro-fine, ultra-flexible wiring and floss cocooning of the sensors to minimize transfer of mechanical noise to the sensor. The specialized isolation can reduce the need for digital noise reduction techniques which can degrade spectrographic images. Additionally, the conical shape of the microphone opening in the housing 800 can serve to amplify/intensify the pressure wave and focus it on the sensor above. Using a design based on the exponential spearfishes curve, the housing 800 can be configured to have an acoustic geometry that creates a natural amplification technique.

Advantageously, by being configured in this manner, the housing 800 can be installed to a fused electrical disconnect of a utility or another device (e.g., a side or front of a building). The configuration of the housing 800 can help avoid the process of installing a fused electrical disconnect to a utility pole, have the local power authority connect power to the disconnect, mount a box to the utility pole, connect the box to the electrical disconnect, and mount the detection inside of the weatherproof box. Deployment in this manner can take multiple days to effect and many hours to deploy. Deployment of the housing 800 can instead take minutes to remove a photocell from a receptacle of a light fixture, replace the photocell with the housing 800 by installing the housing 800 into the receptacle of the light fixture, and insert the photocell into a receptacle on top of the housing 800. This configuration can provide power to the housing 800 from the receptacle (e.g., the socket) of the light fixture, which can then provide power to the photocell. The photocell can pass electrical signals (e.g., electrical signals to control the light of the light fixture) through the housing 800 back to the light fixture. Accordingly, the housing 800 can be installed into the light fixture to allow the light fixture to continue operation of turning the light of the light fixture on when the sun sets and turning the light off at sunrise.

Figure 9:
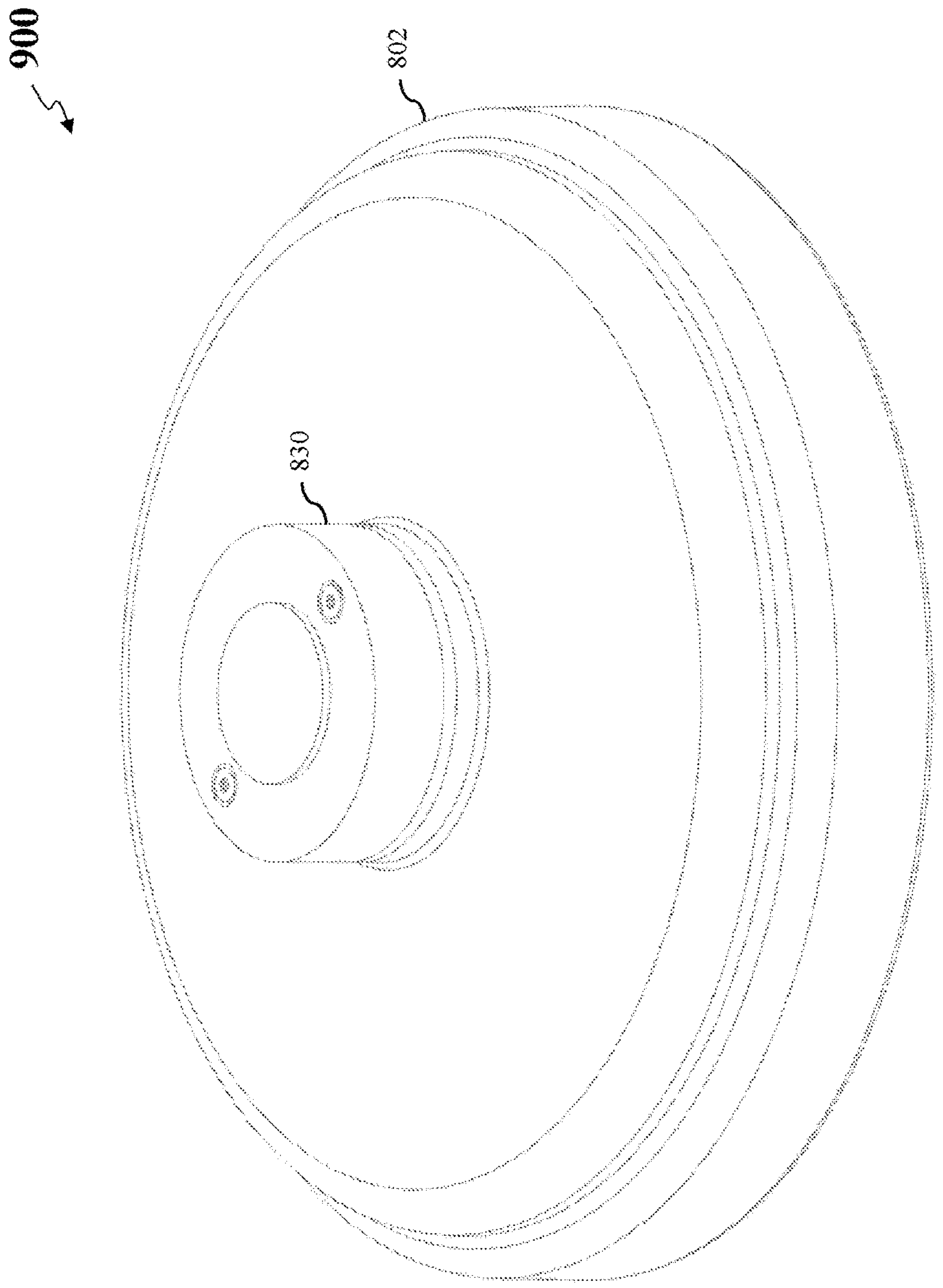
FIG. 9 illustrates a perspective view of a top enclosure of the housing of FIG. 8, according to an embodiment.

FIG. 9 illustrates perspective view 900 of the top enclosure 802, according to an embodiment. As illustrated, the receptacle 830 is mounted to the top enclosure 802.

Figure 10:
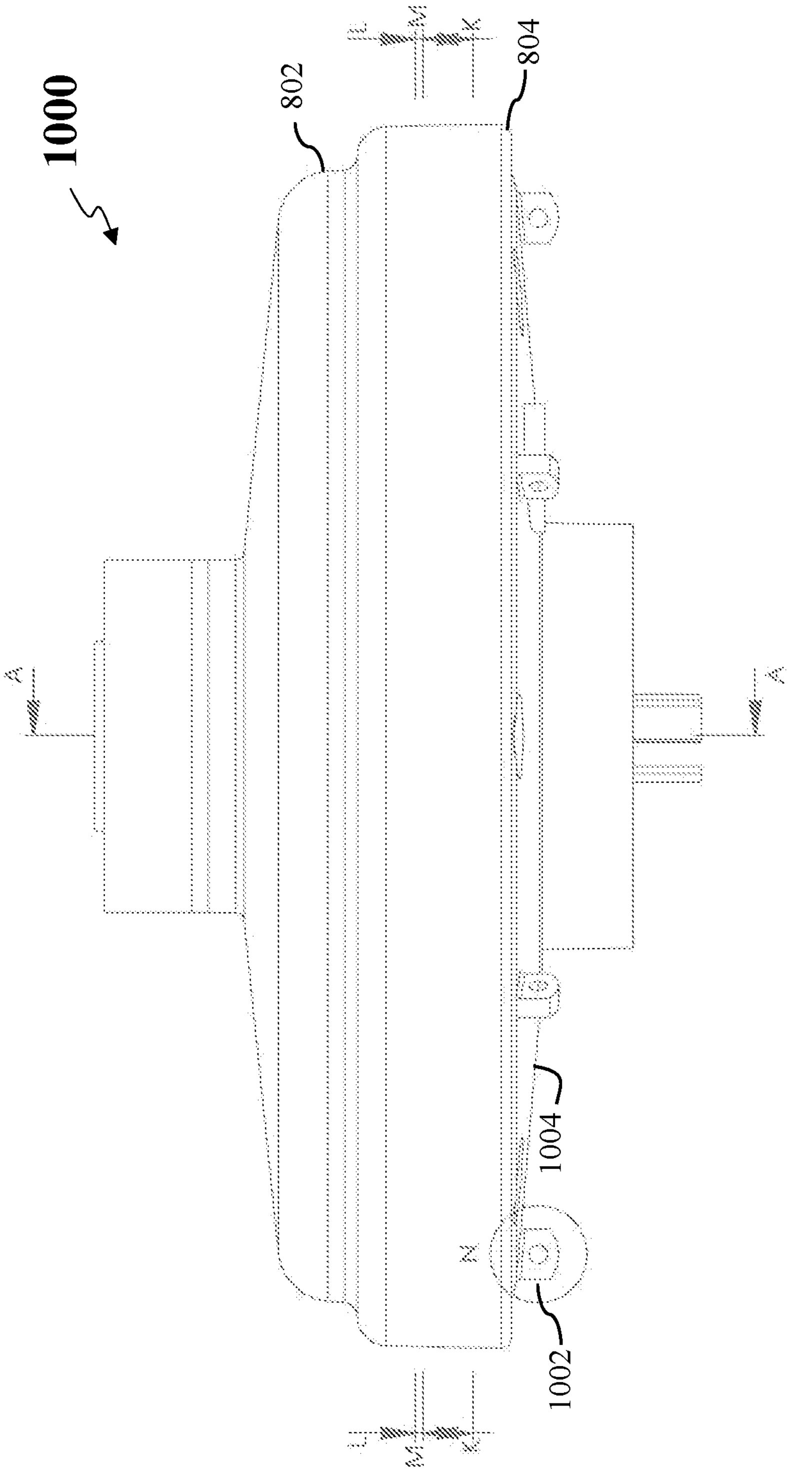
FIG. 10 illustrates a side view of the housing of FIG. 8, according to an embodiment.

FIG. 10 illustrates a side view 1000 of the housing 800, according to an embodiment. In the side view 1000, the top enclosure 802 and the bottom enclosure 804 may be coupled together by screws or other fasteners. The mounting brackets 834 may coupled or fastened to a bottom surface 1004 of the bottom enclosure 804.

The housing 800 can include a plurality of mounting brackets 834 each coupled to the bottom enclosure 804. Each of the mounting brackets 834 can be wide (e.g., a half an inch to two inches) such that a cable may be threaded through only a single mounting bracket 834 when coupling the housing 800 to a light fixture. The housing 800 can include a plurality of mounting brackets 834 that are coupled around the edges of the bottom enclosure at even or uneven intervals. Having multiple mounting brackets 834 may enable an installer to select a mounting bracket 834 (e.g., a single mounting bracket 834) through which to thread a cable to couple the housing 800 to the light fixture.

Figure 11:
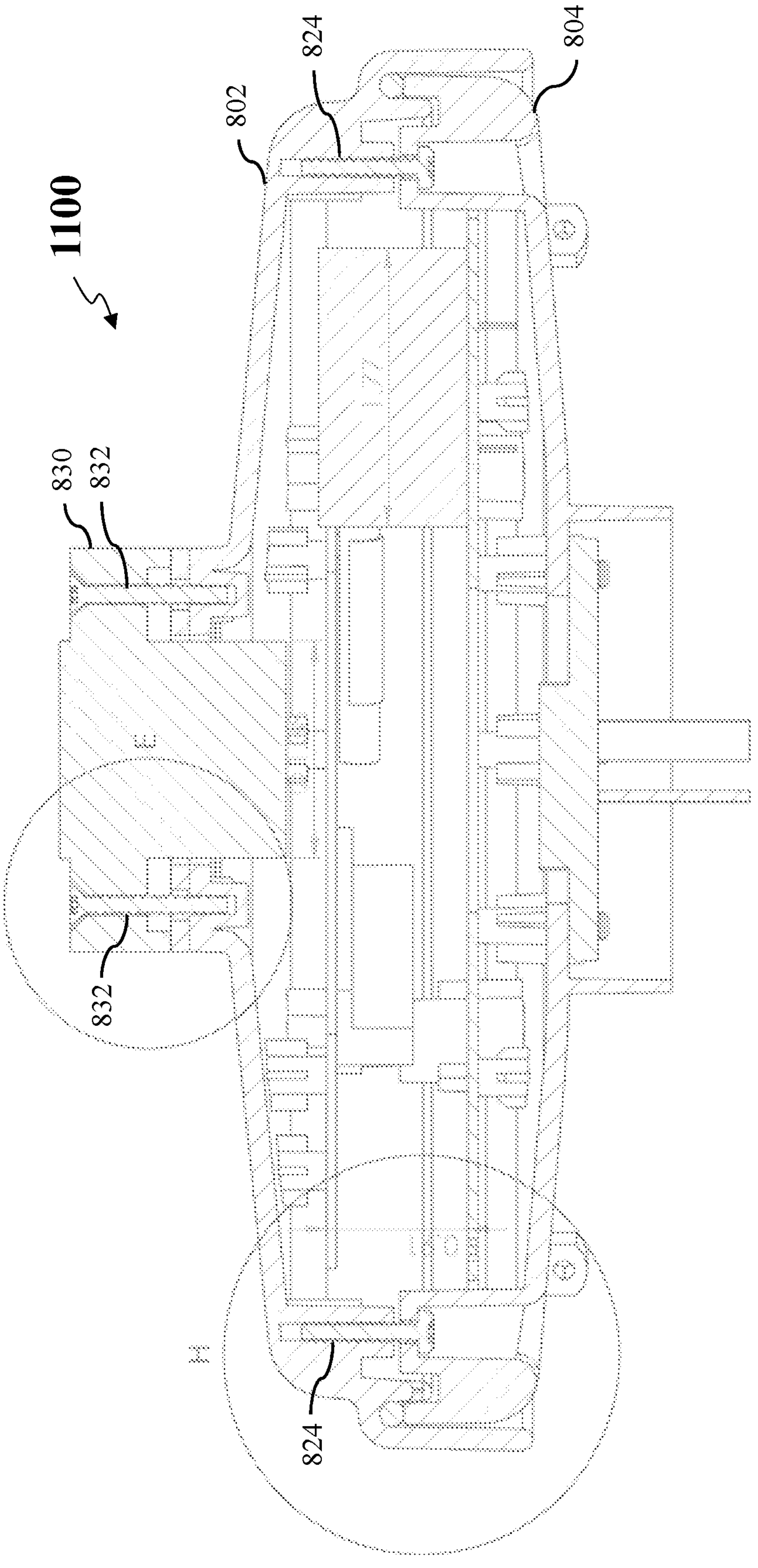
FIG. 11 illustrates a cross-sectional view of the housing of FIG. 8, according to an embodiment.

FIG. 11 illustrates a cross-sectional view 1100 of the housing 800, according to an embodiment. In the cross-sectional view 1100, the receptacle 830 may be coupled with the top enclosure 802 by the screws 832. The bottom enclosure 804 may be coupled with the top enclosure 802 by the screws 824.

Figure 12:
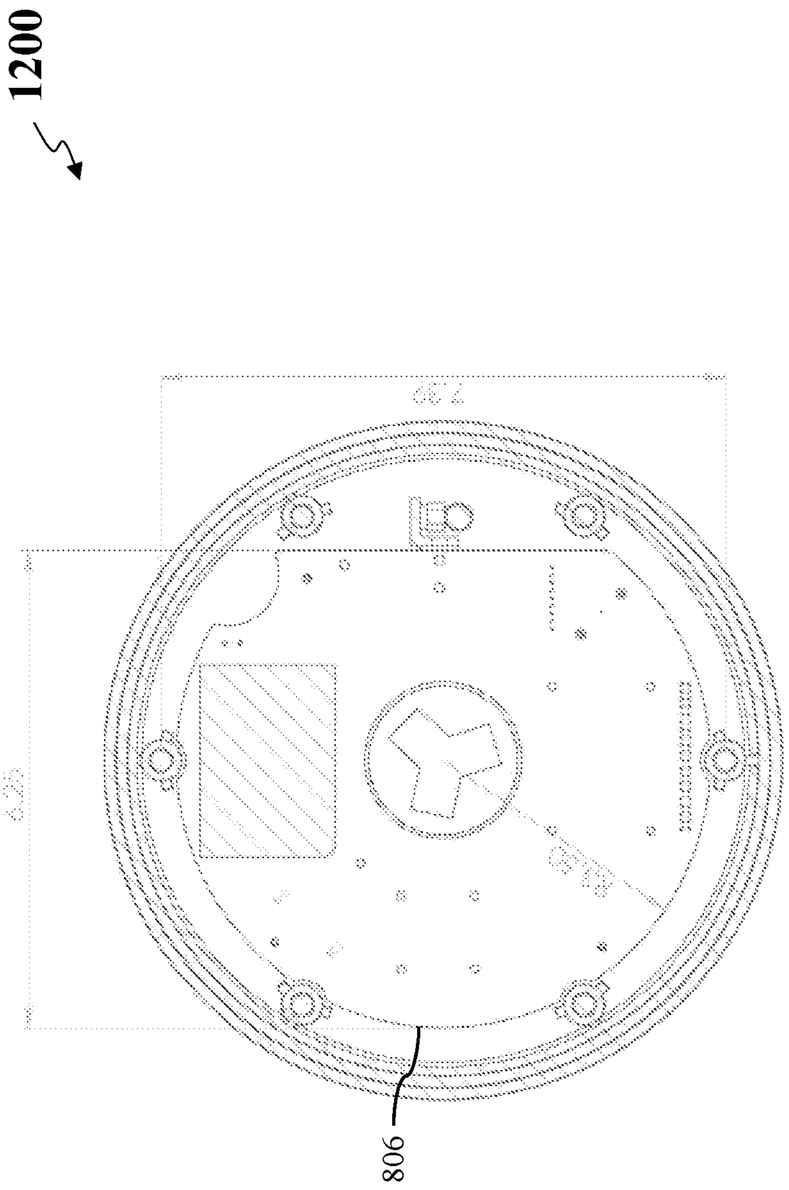
FIG. 12 illustrates a top view of a printed circuit board of FIG. 8, according to an embodiment.

FIG. 12 illustrates a top view 1200 of the printed circuit board 806, according to an embodiment.

Figure 13:
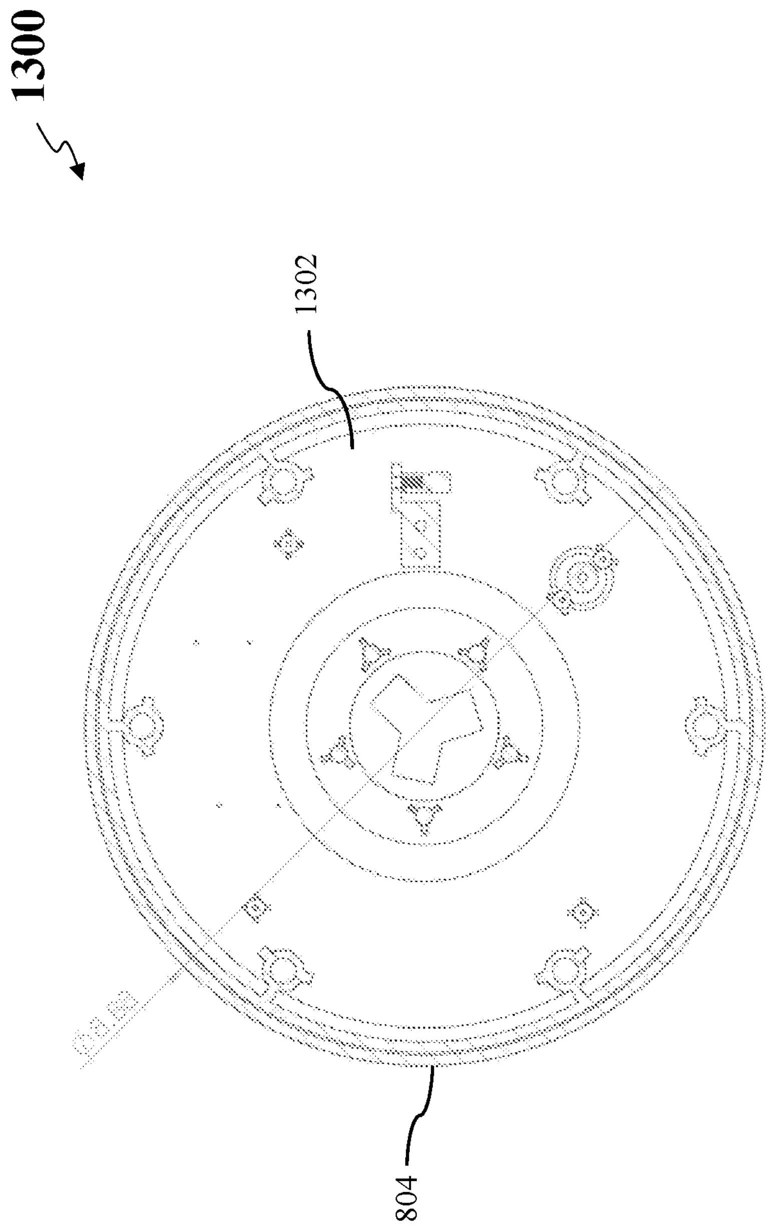
FIG. 13 illustrates a top view of a top surface of a bottom enclosure of FIG. 8, according to an embodiment.

FIG. 13 illustrates a top view 1300 of a top surface 1302 of the bottom enclosure 804, according to an embodiment.

Figure 14:
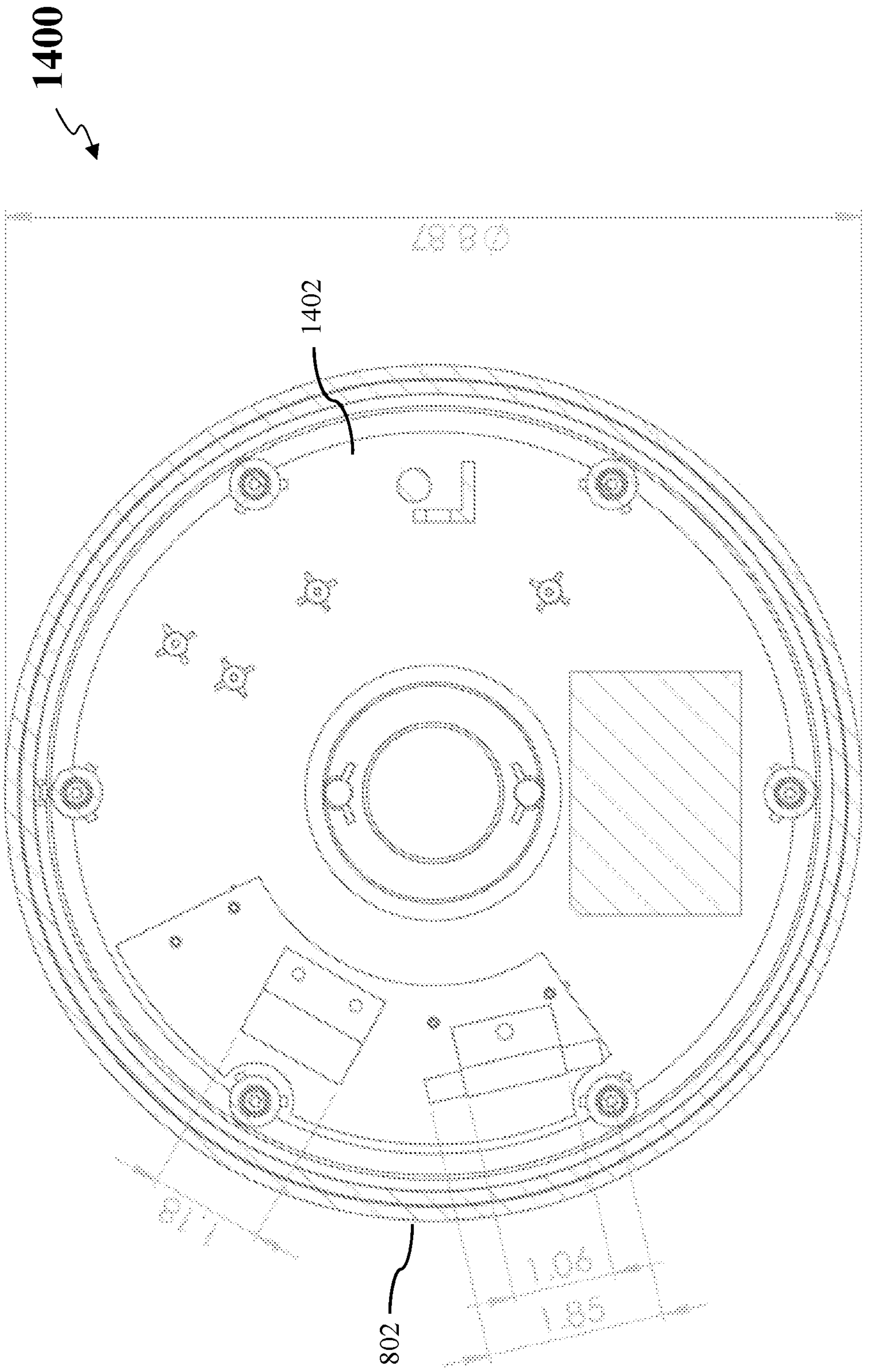
FIG. 14 illustrates a bottom view of a bottom surface of a top enclosure of FIG. 8, according to an embodiment.

FIG. 14 illustrates a bottom view 1400 of a bottom surface 1402 of the top enclosure 802, according to an embodiment.

Figure 15:
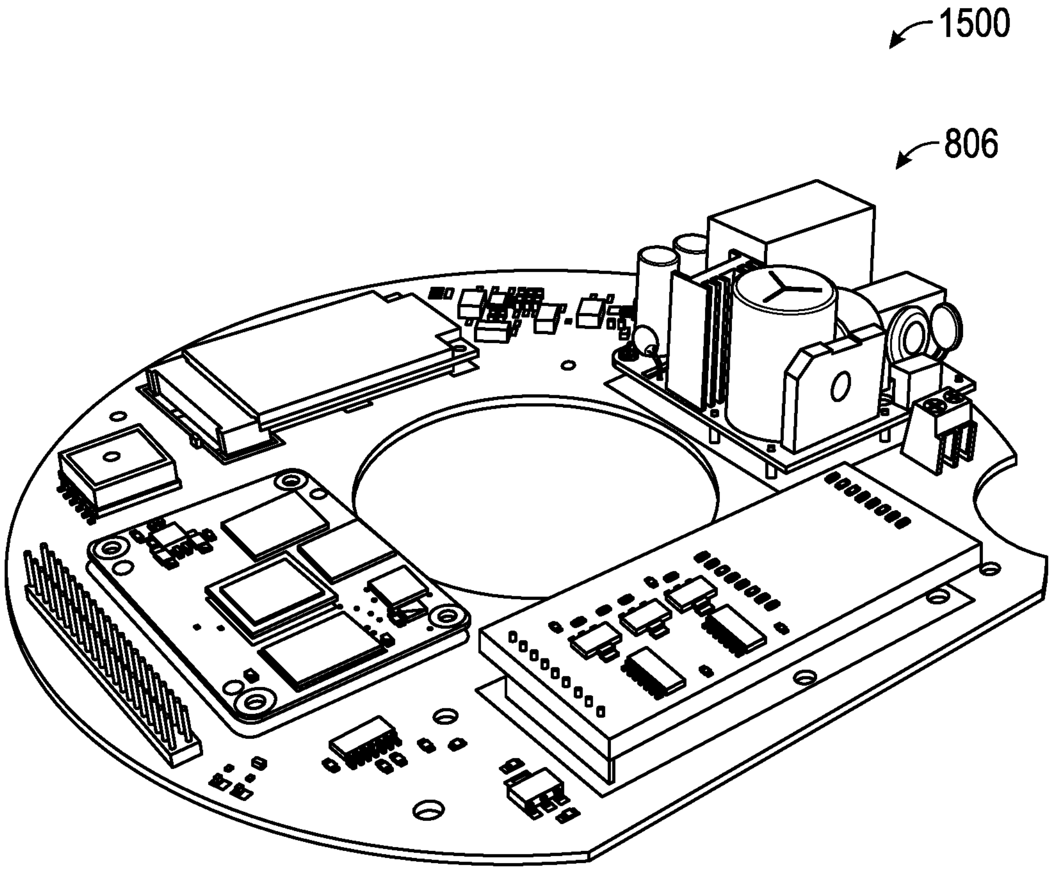
FIG. 15 illustrates a perspective view of a printed circuit board of FIG. 8, according to an embodiment.

FIG. 15 illustrates a perspective view 1500 of the PCB 806, according to an embodiment. The PCB 806 may include the circuitry of a recording device including a microphone and a processor that receives and processes audio data from the microphone. The processor may use machine learning techniques to detect sets of audio data that contain audio of gunshots.

Figure 16A:
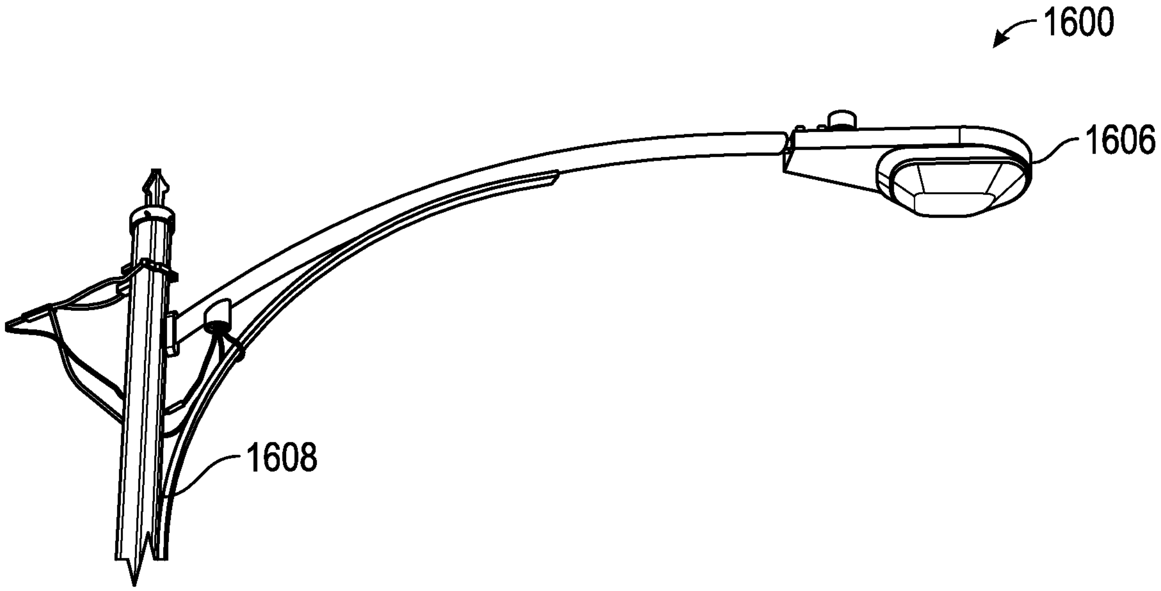
FIGS. 16A-C illustrate perspective views of different light fixtures coupled to light posts to which a recording device can be coupled, according to an embodiment.
Figure 16B:
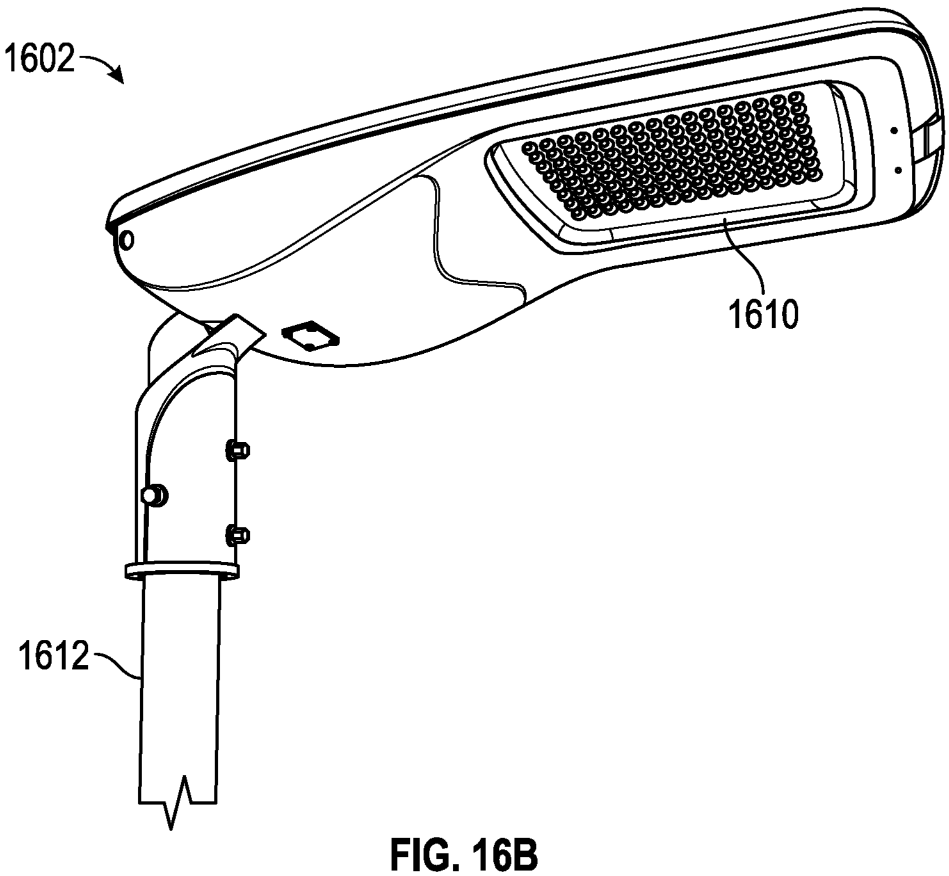
Figure 16C:
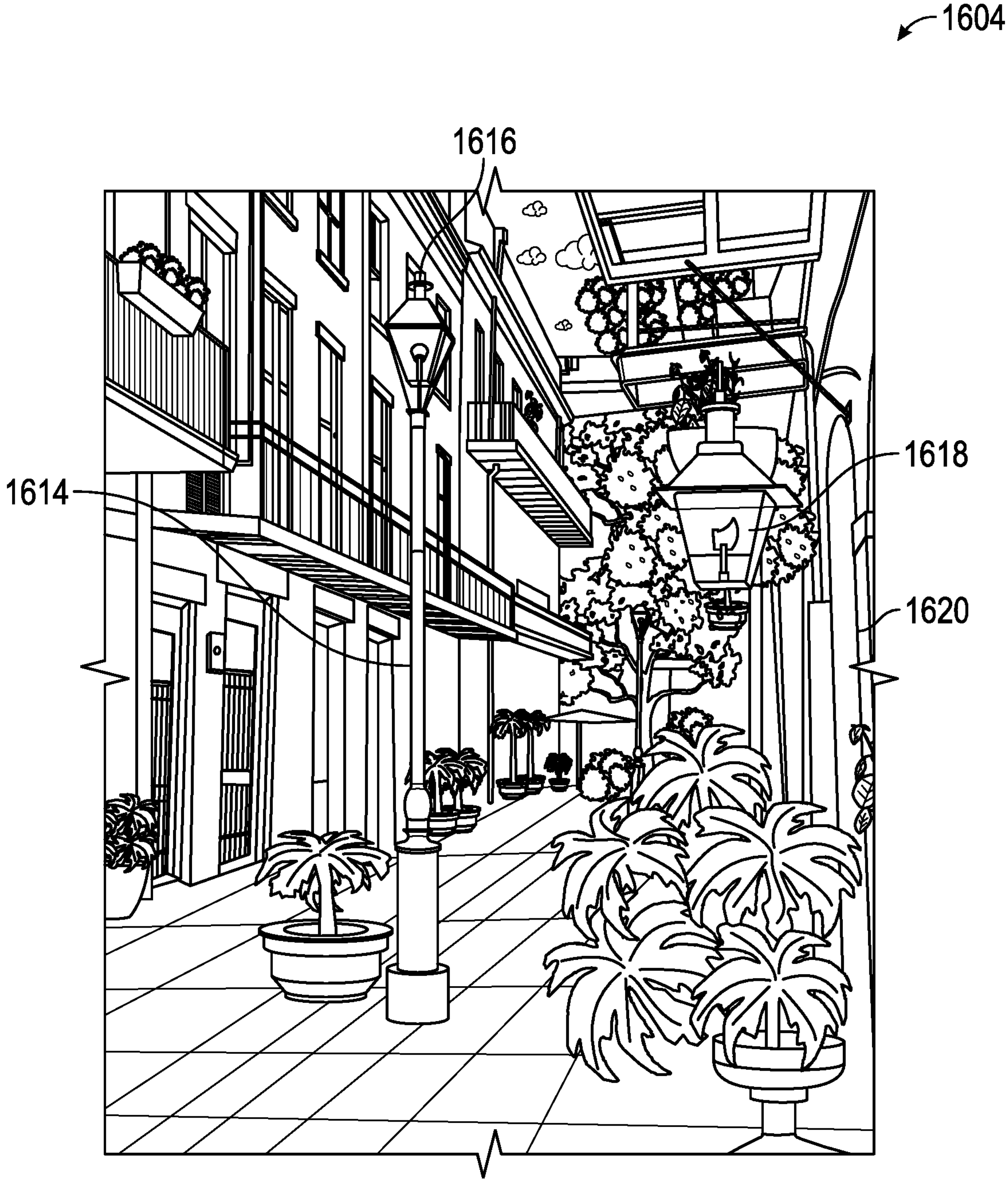

FIGS. 16A-C illustrate perspective views 1600-1604 of different light fixtures coupled to light posts to which a recording device (e.g., the recording device 120) can be coupled, according to an embodiment. A light fixture 1606 can be coupled to a light post 1608. In the perspective view 1602, a light fixture 1610 can be coupled with a light post 1612. In the perspective view 1604, a light fixture 1614 can be coupled with a light post 1616. The perspective view 1604 can also include a light fixture 1618 coupled with a building 1620. Each light fixture 1606, 1610, and 1614 can receive power through power cords running through the light posts 1608, 1612, and 1616 to which the light fixtures 1606, 1610, and 1614 are attached. Lights can be coupled or attached to the light fixtures 1606, 1610, and 1614 to receive power and light up. Light fixtures can be coupled to lights of any configuration.

While light fixtures as described herein are described as coupled to different light posts, light fixtures can be coupled to other objects through power cords as well. For example, as illustrated in the perspective view 1604, the light fixture 1618 can be coupled with the building 1620. The building 1620 can be electrically coupled to a power or utility grid and the light fixture 1618 can be coupled to the same power or utility grid through wiring of the building 1620.

Recording devices (e.g., the recording device 120) can be coupled to the light fixtures 1606, 1610, and 1614. Recording devices can be coupled to the light fixtures 1606, 1610, and 1614 using a male and female twist lock electrical connector between the housings of the recording devices and the light fixtures 1606, 1610, and 1614. In doings, photocells that were original connected to the light fixtures 1606, 1610, and 1614 can be removed from the light fixtures 1606, 1610, and 1614 and replaced with the recording devices. The photocells can then be placed onto opposing ends of the housings of the recording devices from the ends that have the twist-lock electrical connection with the light fixtures 1606, 1610, and 1614. In instances in which a light post does not have a light fixture but includes a live twist-lock socket, a recording device can be directly coupled or connected to the light post through the live twist-lock socket.

Figure 17:
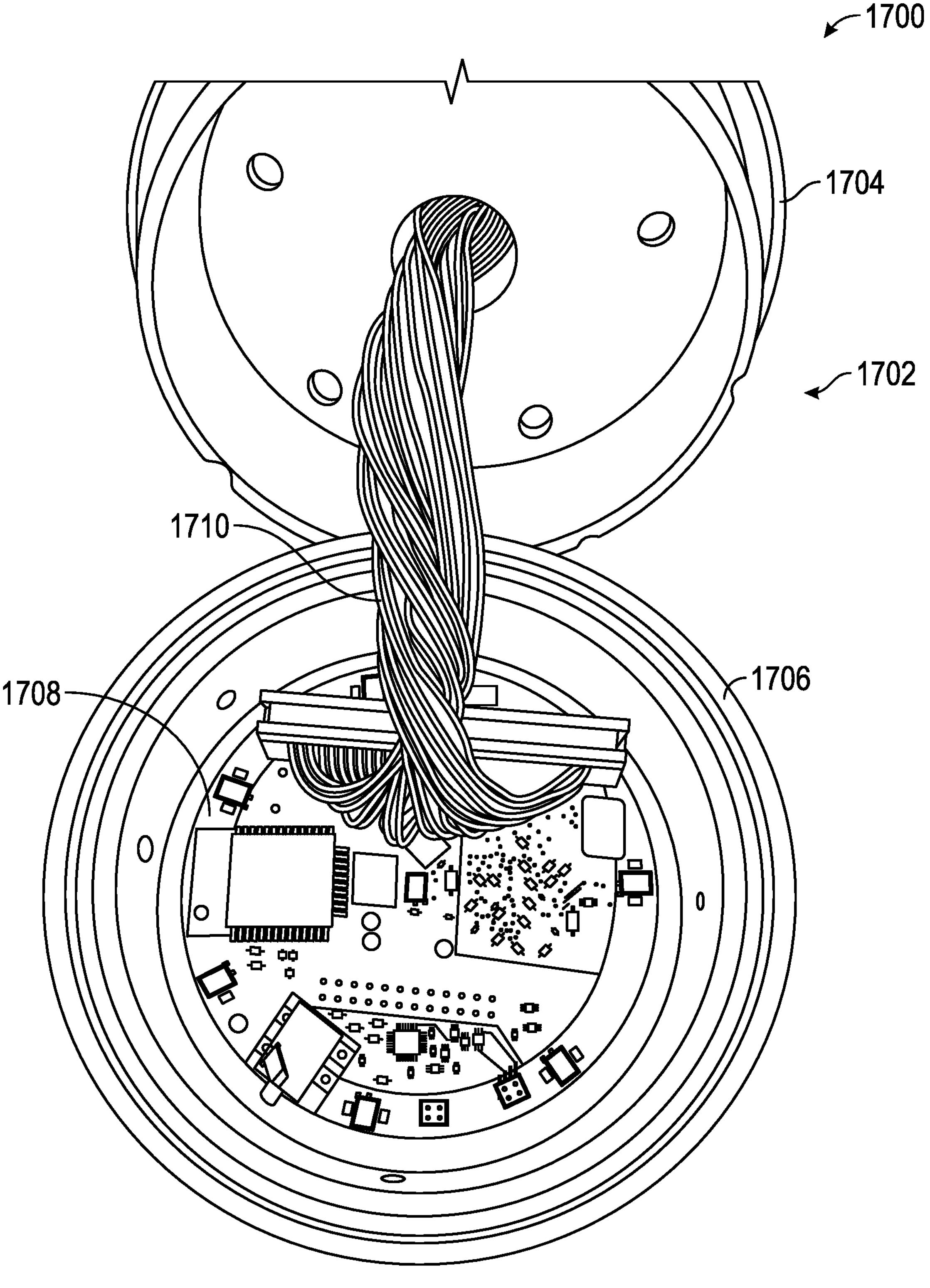
FIG. 17 illustrates a perspective view of a recording device, according to an embodiment.

FIG. 17 illustrates a perspective view 1700 of a recording device 1702, according to an embodiment. The recording device 1702 may be the same as or similar to the recording device 120. The recording device 1702 may include a housing with a top enclosure 1704 and a bottom enclosure 1706. A PCB 1708 may be mounted or attached to the bottom enclosure 1706. The PCB 1708 may have power cords 1710 plugged into circuitry mounted on the PCB 1708. The PCB 1708 may include or be connected to an array of microphones (e.g., multiple microphones connected to the PCB 1708). The microphones may be the same as or similar to the microphones 406. The power cords 1710 may enable a camera to mount or attach to the top enclosure 1704, such as in a receptacle of the top enclosure 1704. In some cases, the power cords 1710 may connect the circuitry of the PCB 1708 to the camera mounted to or on top of the top enclosure 1704. The power cords 1710 may provide power to the camera and/or enable the circuitry of the PCB 1708 to rotate the camera to locations of detected gunshots and otherwise control the camera. In some cases, the circuitry may include a communications interface to communicate with a camera that is remote from the recording device 1702 over a network.

A housing of the recording device 1702 can screw to the bottom of a mounting surface of an enclosure (e.g., a housing of another recording device, such as the recording device 120, or a housing of a camera) or a mount on a surface. The recording device 1702 can include a processor coupled to circuitry of the PCB 1708. The processor can be embedded into a sensor array board (e.g., a board containing an array of sensors or microphones) of the recording device 1702, in some cases with a plurality of sensors. The sensors of the array of sensors may be the same as or similar to the microphone 406. The sensor array board may be a part of the PCB 1708. In some cases, the array of sensors may be separately dispersed around the PCB 1708. The processor can be powered by a power over Ethernet system, which can be the same system powering a camera (e.g., pan tilt zoom (PTZ) camera) the processor can control based on audio data generated by the sensor array.

The housing of the recording device 1702 can employ a self-tensioning closure methodology. The self-tensioning closure methodology can allow the top and bottom enclosures 1704 and 1706 to increase pressure onto an o-ring seal as the o-ring seal is twisted to a closed position. Detents, slots/grooves, and spring elements, created of the same or a similar material as the housing, can be molded as part of the housing. The detents can slide down the grooves as the cover is twisted and come to rest at the end of the groove, held in place by tension and the synthetic spring created by the unique design. This housing can be created in a three-dimensional printed model, injection molded, or fabricated in other manners.

The processor can use audio data from the array of sensors or microphones to calculate the time of arrival of audio data generated actionable sounds (e.g., gunshots, car crashes, screams, etc.). Actionable sounds can be events as described above. For example, the processor can identify sets of audio data from the different microphones that contain audio data of an actionable sound. The processor can identify such sets of audio data by generating spectrograms from the sets of audio data generated by the different microphones and using machine learning techniques (e.g., machine learning techniques similar to those described herein such as those used by the first and/or second machine learning models described with reference to FIG. 2) on the spectrograms to identify sets of audio data that contain audio data of an actionable sound and/or times of the actionable sound in the different sets of audio data. The times of the actionable sounds may be times of arrival of the actionable sounds for the different sensors.

The processor can identify the location of the actionable sound relative to the camera. For example, based on the times of arrival and locations of the sensors that generated and/or provided audio data of the actionable sound, the processor can use sound localization techniques to identify the location (e.g., the source) of the actionable sound relative to the array of sensors. The processor can then determine a location of the actionable sound relative to the camera using one or more algorithms, such as the law of cosines or the law of sines based on a vector from the location of the array of sensors to the location of the actionable sound, a vector from the location of the array of sensors to a location of the camera, and an angle between the two vectors. From this calculation, the processor can create a three-dimensional digital representation of the source of the sound in relevance to the location of the sensor array. That data can be modified algorithmically using the relative positioning of the sensor array and the zero position of the PTZ camera. The processor can generate a directional command including an azimuth and an elevation to rotate the camera to point to the location of the actionable sound. The processor can transmit the directional command to the camera, in some cases with an instruction to change the state of the camera to an "on" state to begin recording. The camera can receive the directional command and/or the instruction to change state and operate according to the command and instruction.

The processor can transmit an indication to a remote processor that indicates the actionable sound was detected and/or that the camera rotated to have a field of view including the location of the actionable sound. The processor can include an identification of the camera that was rotated and/or an identification of the recording device that detected the actionable sound in the indication. The remote processor may generate and present a user interface at a display of a remote computing device. Accordingly, a user or operator accessing the remote computing device can be notified in real-time that a camera has relevant live imagery for their review and/or that the camera field of view has been repositioned.

Figure 18:
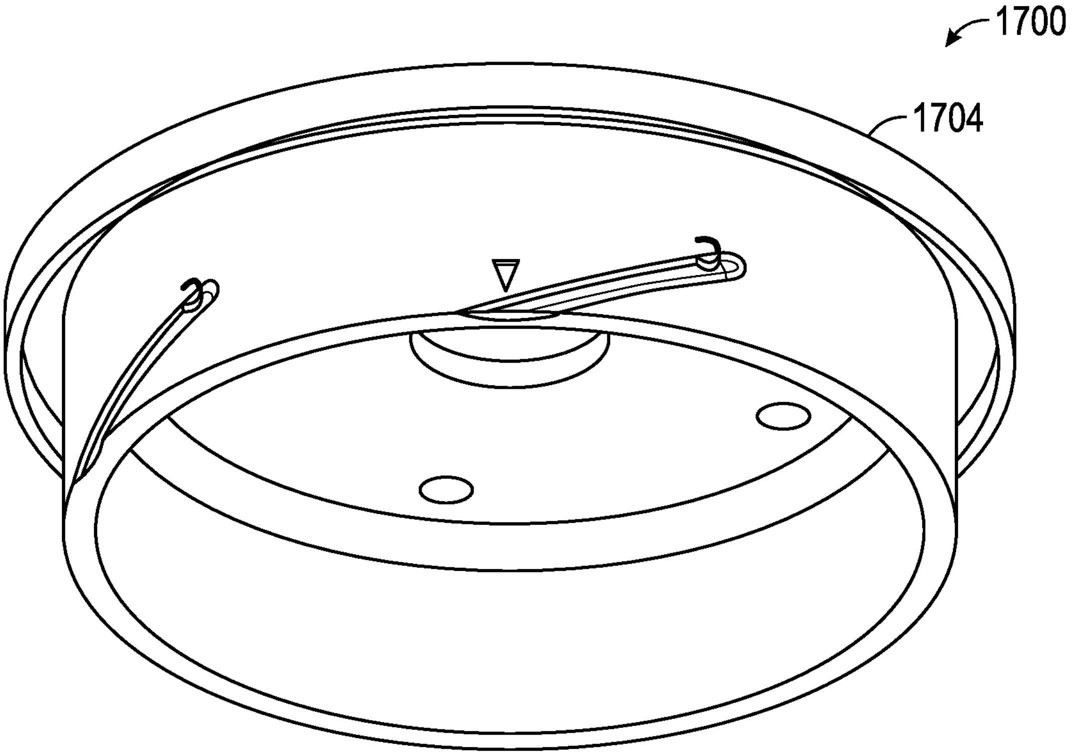
FIG. 18 illustrates a perspective view of a top enclosure of a housing of the recording device of FIG. 17, according to an embodiment.

FIG. 18 illustrates a perspective view 1800 of the top enclosure 1704 of the recording device 1702, according to an embodiment.

Figure 19:
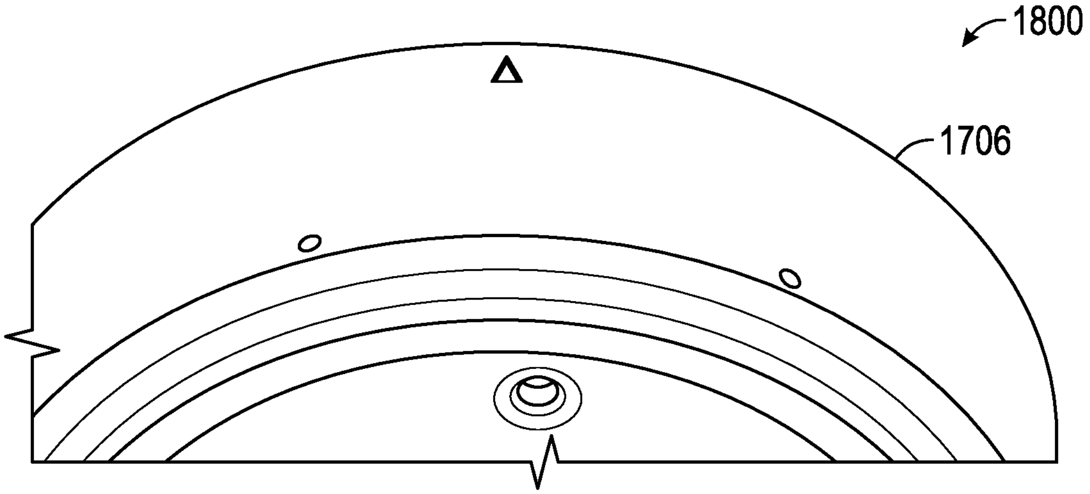
FIG. 19 illustrates a perspective view of a bottom enclosure of a housing of the recording device of FIG. 17, according to an embodiment.

FIG. 19 illustrates a perspective view 1900 of the bottom enclosure 1706 of the recording device 1702, according to an embodiment.

Figure 20:
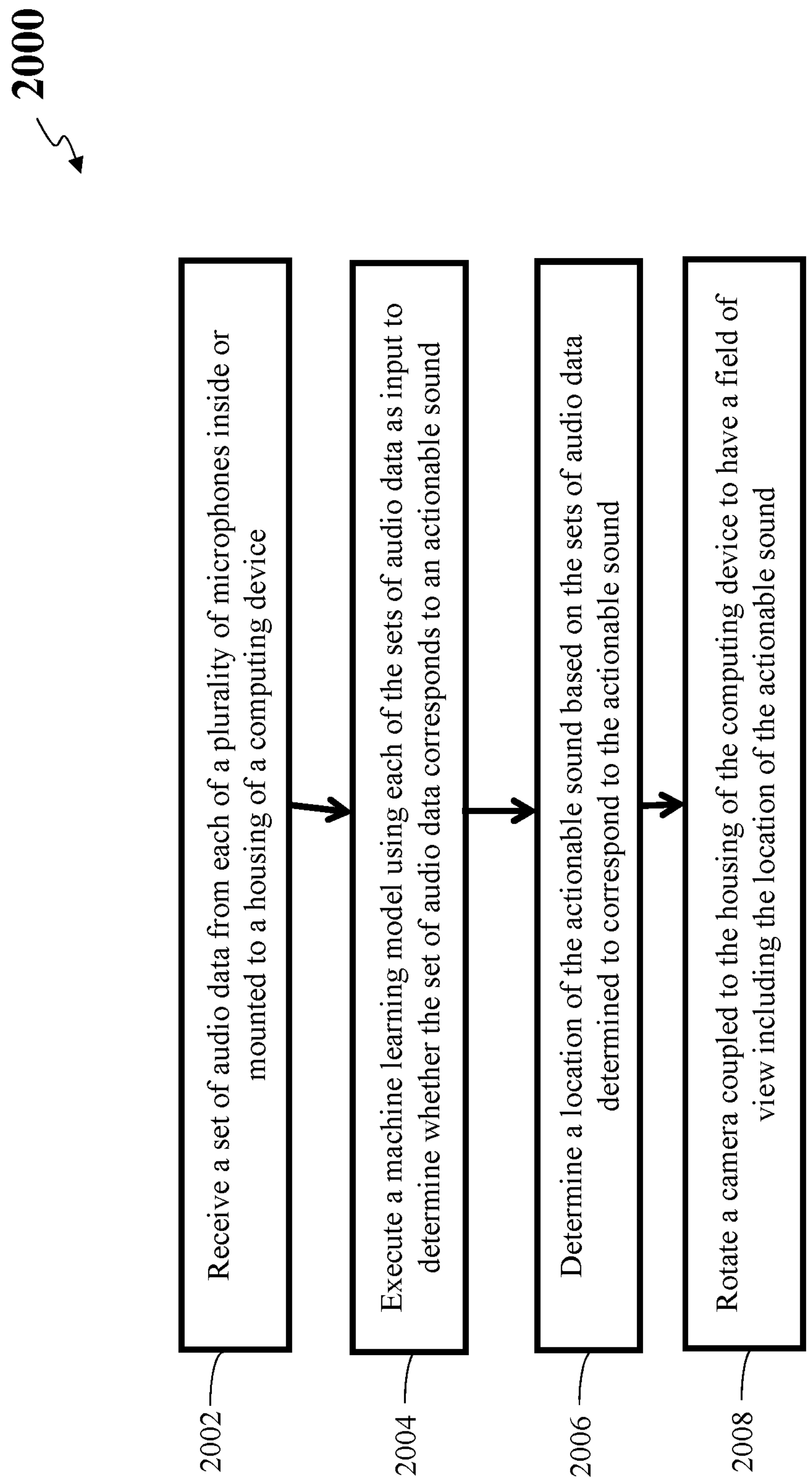
FIG. 20 is a flow diagram illustrating an exemplary method for detecting actionable sounds, according to an embodiment.

FIG. 20 is a flow diagram illustrating an exemplary method 2000 for detecting actionable sounds, according to an embodiment. The method 2000 may include steps 2002-2008. However, other embodiments may include additional or alternative steps, or may omit one or more steps altogether. The method 2000 is described as being executed by a recording device (e.g., one or both of the recording device 120 or the recording device 1702). However, one or more steps of the method 2000 may be executed by any number of computing devices operating in the distributed computing system. For instance, one or more computing devices may locally perform part or all of the steps described in FIG. 20 or a cloud device may perform such steps. The method 2000 can be performed in addition to or during any of the steps of the method 200.

In step 2002, the recording device may receive a set of audio data. A processor of the recording device can receive the set of audio data. The recording device can receive sets of audio data from each of a plurality of microphones. The plurality of microphones may be inside or mounted to a housing of the recording device. The sets of audio data may be or include a sound recording from audio collected within a particular time frame. The plurality of microphones may continuously record sounds made in the environment surrounding the recording device. As the microphones record the sounds, the microphones can transmit the recorded sounds to the processor of the recording device for further processing.

The recording device may generate spectrograms from the sets of audio data. The recording device may generate the spectrograms for each of the sets of audio data, for example, by calculating the Fourier transforms of various segments (e.g., equal-length segments) of the set of audio data in which the frequency of the audio data does not substantially change. The recording device may then generate a graph of the output of the Fourier transform calculation. The graph may illustrate the decibels of the audio data at different frequencies.

When generating the spectrograms for the sets of audio data, the recording device may include timestamps in the spectrograms of the real-world times in which the respective audio data was generated or received from the plurality of microphones (e.g., the times of arrival). The recording device may do so, for example, by storing and maintaining a clock indicating the current time. As the recording device receives the audio data of the sets of audio data, the recording device can label the audio data with timestamps indicating the times in which the recording device received the audio data or the times in which the recording device received the audio data minus a defined offset to account for the time it may take for the microphones to generate and transmit the sets of audio data. The recording device can generate the spectrograms with the timestamps.

The recording device may generate spectrograms for sets of audio data from audio data generated by the microphones collected within defined time periods. For example, the recording device can sample data from different time periods into sets of audio data. The time periods may be overlapping or non-overlapping with each other. The time periods may have defined lengths. The recording device may segment the audio recordings into sets of audio data for the different time periods.

The recording device can generate separate spectrograms for sets of audio data the recording device generates or receives from each of the plurality of microphones. For example, during a time period, the recording device can concurrently receive audio data generated by the plurality of microphones within the housing of the recording device. The recording device can partition the audio data into sets of audio data that each correspond to the microphone from which the recording device received the audio data. The recording device can do so, for example, by labeling the audio data with identifiers (e.g., numeric or alphanumeric identifiers) of the microphones from which the recording device received the audio data. The recording device can receive the audio data from the different microphones and sample the audio data into different sets of audio data. The recording device can then generate spectrograms from the different sets of audio data.

In step 2004, the recording device may execute a machine learning model using each of the sets of audio data as input. The machine learning model may be a neural network, a deep learning model, a support vector machine, a random forest, etc., that is trained to analyze spectrograms to determine whether an actionable sound (e.g., a gunshot, a car crash, a scream, etc.) occurred during the time period of the spectrogram and/or a time of the actionable sound. The machine learning model may be a binary classification machine learning model that outputs a binary value indicating that a spectrogram does include audio data of an actionable sound or that a spectrogram does not include audio data of an actionable sound. The machine learning model may additionally or instead output a time of the spectrogram in which the actionable sound occurred. The recording device may execute the machine learning model using the spectrogram of a set of audio data as input. The machine learning model may output a binary value indicating whether the set of audio data includes audio data of an actionable sound and/or a time of such an actionable sound. The machine learning model may similarly execute the machine learning model using spectrograms of audio data provided by each of the plurality of microphones of the recording device.

The machine learning model may output binary values indicating whether the sets of audio data include audio data of actionable sounds and/or a time of such an actionable sound. If the machine learning model outputs as value indicating none of the sets of audio data include audio data of an actionable sound, the recording device may discard each of the sets of audio data (e.g., remove the sets of audio data from memory) and stop performing the method 2000. However, if the machine learning model outputs at least one value indicating a set of audio data does include audio data of an actionable sound (e.g., a binary value indicating the set of audio data includes audio data of an actionable sound and/or a timestamp of such an actionable sound), the recording device may determine the set of audio data is associated with an actionable sound. The recording device can identify any other sets of audio data that include values indicating the set of audio data includes audio data of an actionable sound. The recording device can discard any sets of audio data the recording device determines do not include audio of an actionable sound.

In step 2006, the recording device can determine a location of the actionable sound. The recording device can determine the location of the actionable sound based on the sets of audio data the recording device determined to correspond to (e.g., include audio data of) the actionable sound. The recording device can determine the location of the actionable sound as the location of the actionable sound relative to a camera (e.g., a camera coupled to the housing of the recording device or a camera remote from the recording device). The location of the actionable sound relative to the camera can be a distance and/or direction of the location from the camera. The location can be a or include a vector (e.g., a three-dimensional vector) and/or a distance. To do so, the recording device can identify the times of arrival of the sets of audio data that contain the actionable sound (e.g., times of the actionable sound determined from the different sets of audio data). The recording device can also identify the locations of the different microphones that provided the recording device with sets of data that contain the actionable sound. The recording device can use three-dimensional sound localization techniques based on the locations of the microphones and the times of arrival of the actionable sound. In doing so, the recording device can generate a three-dimensional digital representation (e.g., a three-dimensional vector) of the location (e.g., the source) of the actionable sound relative to the sensors (e.g., identify the location of the actionable sound relative to the microphones). The recording device can determine a vector between the plurality of microphones and the location of the actionable sound. The recording device can identify or determine a vector between the plurality of microphones that provided sets of audio data including the actionable sound (e.g., the middle or centroid of the plurality of microphones) and the camera. The recording device can determine an angle between the two vectors. The recording device can determine the location of the actionable sound relative to the camera based on the two vectors and the angle such as by using the law of sines or the law of cosines.

In step 2008, the recording device can rotate a camera. The recording device can rotate the camera for which the recording device determined the relative position of the actionable sound to the camera. The camera can be coupled to the housing of the recording device or be remote from the recording device. The recording device can identify a direction in which the camera is pointing. The recording device can determine an angle between the direction in which the camera is pointing and the location of the actionable sound relative to the camera. Based on the angle, the recording device can determine an azimuth and an elevation in which to rotate the camera to cause the camera to point in the direction of the location of the actionable sound (e.g., cause the location of the actionable sound to be in the field of view of the camera). The recording device can transmit the azimuth and the elevation to the camera across a network to rotate the camera.

Responsive to rotating the camera to point in the direction of the location of the actionable sound, the recording device can activate the camera (e.g., change the state of the camera from “off” to “on”). Upon being activated, the camera can begin recording a video of the field of view of the camera. The camera can transmit the recorded video to a remote computing device. The camera can do so directly across a network or by transmitting the recorded video to the recording device, which can forward the recorded video to the remote computing device. The camera and/or the recording device can do so in real-time to provide a live video feed of the field of view of the camera including the location of the actionable sound. Accordingly, the recording device and camera can operate in tandem to provide the remote computing device with a live feed of the aftermath of an actionable sound.

The recording device can transmit an alert identifying the camera or the recording device to a remote computing device responsive to determining at least one set of audio data corresponds to the actionable sound. The remote computing device can be a computing device of a video management system that operates cameras around municipal area in which the recording device is located. Responsive to receiving the alert, a user accessing the remote computing device can select an option and/or otherwise video a live video feed being provided by the camera. In some cases, the recording device can transmit the determined elevation and azimuth (or pan, tilt, zoom operations) to the remote computing device in the alert. In such cases, the remote computing device can control the camera according to the transmitted elevation and azimuth or pan, tilt, zoom operations. Receipt of the determined elevation and azimuth (or pan, tilt, zoom operations) may cause the remote computing device to automatically control the camera according to the received information. Such may be advantageous, for example, in cases in which the recording device is not in communication with the camera.

Figure 21:
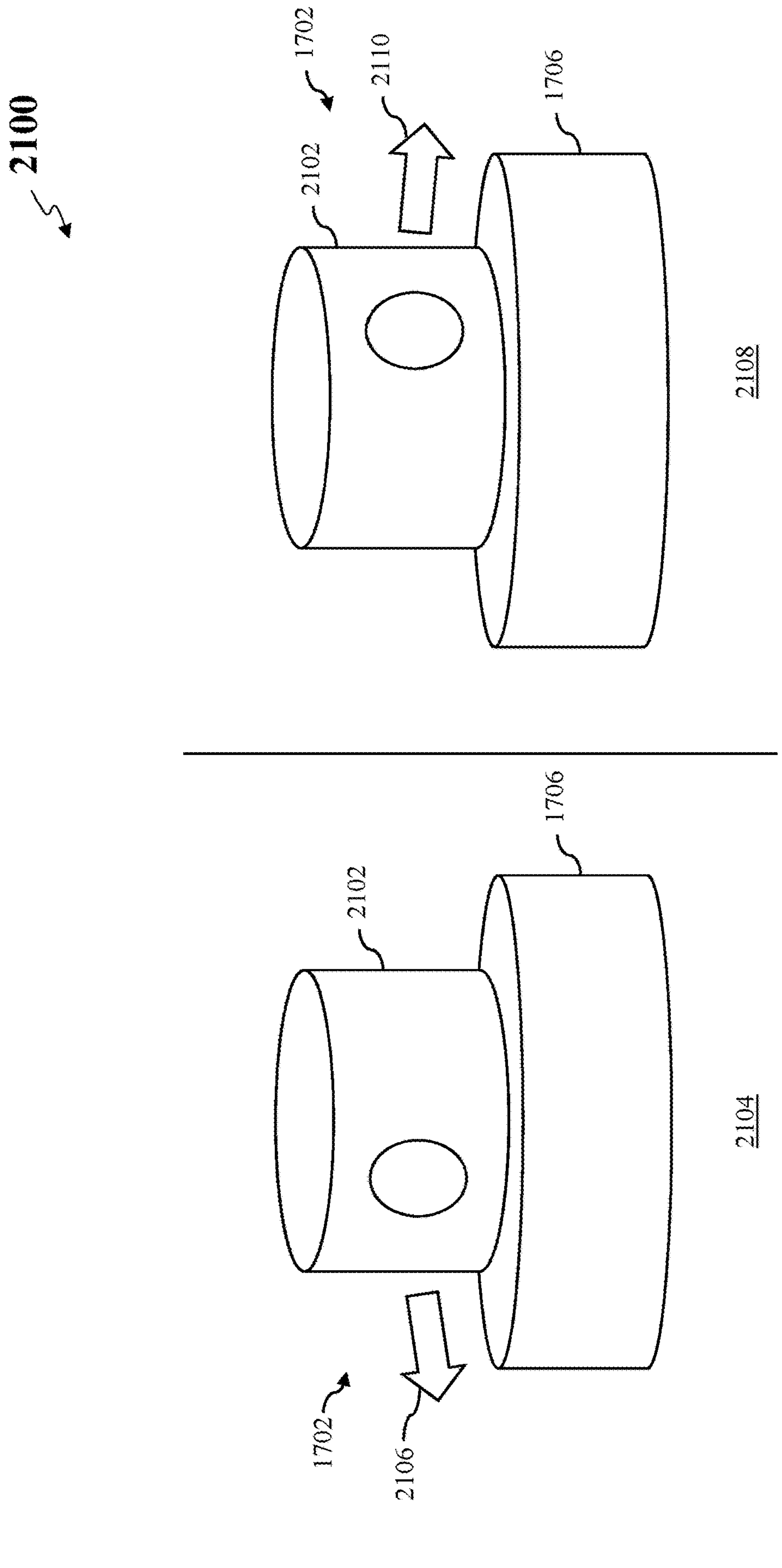
FIG. 21 illustrates a sequence of rotating a camera of a recording device in response to detecting a gunshot, according to an embodiment.

FIG. 21 illustrates a sequence 2100 of rotating a camera 2102 of the recording device 1702, according to an embodiment. In the sequence 2100, the camera 2102 may initially be in a first state 2104 pointing in a first direction 2106. The processor of the recording device 1702 may determine a location of a gunshot and/or a direction to point the camera 2102. The processor may transmit a control signal to the camera 2102 to cause the camera 2102 to rotate to be in a second state 2108 pointing in a second direction 2110 at the location of the gunshot.

Figure 22A:
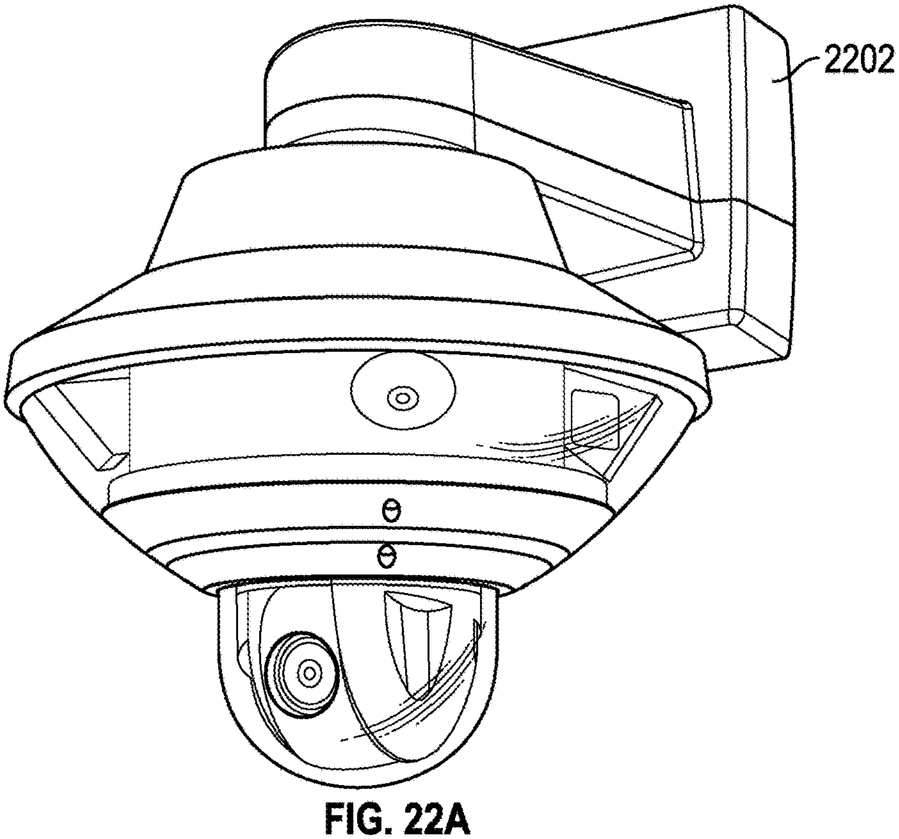
FIGS. 22A-B illustrate different camera types that can be rotated in response to detecting a gunshot, according to an embodiment.
Figure 22B:
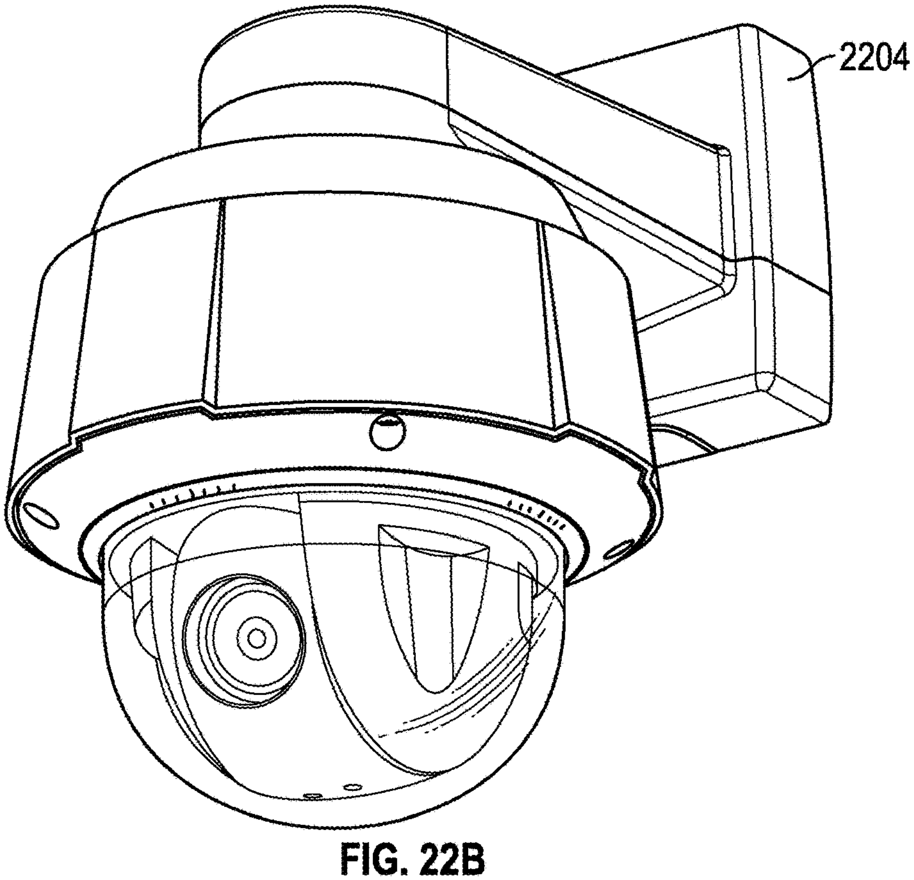

FIGS. 22A-B illustrate different cameras 2202 and 2204 that can be rotated in response to detecting a gunshot, according to an embodiment. The cameras 2202 and 2204 can be rotated by a processor controlling the cameras 2202 and 2204 in response to the processor detecting actionable sounds (e.g., gunshots, car crashes, screams, etc.). The processor can be stored remote from or in the housing of the camera 2202 or the camera 2204, in some cases with microphones that continuously record audio of the surrounding environment. The processor can perform the method 2000 to detect actionable sounds from audio data the processor receives from the microphones and rotate one of the cameras 2202 or 2204 to cause the field view of the camera 2202 or 2204 to include the location of the actionable sound. Cameras 2202 and 2204 are example cameras. Any type of camera can be rotated to capture video of a location from which an actionable sound was detected. In some cases, the processor can be remote from the camera 2202 or 2204 and communicate with the camera 2202 or 2204 over a network.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as “then”, “next”, etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disk (CD), laser disc, optical disk, digital versatile disk (DVD), floppy disk, and Blu-ray disk where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A system, comprising a first computing device comprising a first processor configured to:

receive a set of audio data from a microphone;

execute a first sound detection machine learning model using the set of audio data as input to determine whether the set of audio data corresponds to an actionable sound, the set of audio data comprising a plurality of sounds; and responsive to determining the set of audio data corresponds to the actionable sound, transmit the set of audio data to a second computing device; and the second computing device comprising a second processor configured to:

execute a time detection machine learning model using the set of audio data as input to determine an instance and time of the actionable sound within the set of audio data; and determine a location of the actionable sound based at least on the time of the actionable sound in the set of audio data.

2. The system of claim 1, wherein the second processor is further configured to:

perform an automated action based on the determined location of the actionable sound.

3. The system of claim 2, wherein the second processor is configured to:

receive a second set of audio data from a third computing device comprising a third processor, the second set of audio data comprising a second plurality of sounds;

execute the time detection machine learning model using the second set of audio data as input to determine a second instance and second time of the actionable sound within the second set of audio data; and determine the location of the actionable sound based at least on the second time of the second instance of the actionable sound in the second set of audio data.

4. The system of claim 3, wherein the third processor of the third computing device is configured to:

receive the second set of audio data from a second microphone;

execute a second sound detection machine learning model using the second set of audio data as input to determine whether the second set of audio data corresponds to the actionable sound, and transmit the second set of audio data to the second computing device responsive to determining, based on the execution of the second sound detection machine learning model, the second set of audio data corresponds to the actionable sound.

5. The system of claim 1, wherein the second processor is configured to determine the location of the actionable sound using multilateration techniques on the time of the actionable sound.

6. The system of claim 1, wherein the second processor is further configured to:

transmit an indication of the location of the actionable sound to a remote computing device.

7. The system of claim 6, wherein receipt of the indication of the location of the actionable sound by the remote computing device causes the remote computing device to direct a camera to the location of the actionable sound and activate a livestream with the camera.

8. The system of claim 1, wherein the second processor is further configured to:

receive a second set of audio data from a third computing device;

identify a location of the third computing device;

determine a time in which the actionable sound reached the third computing device based at least on the location of the actionable sound.

9. The system of claim 8, wherein the second processor is further configured to:

assign a label indicating the time in which the actionable sound reached the third computing device to the second set of audio data; and train the time detection machine learning model using the second set of audio data received from the third computing device based on the label indicating the time in which the actionable sound reached the third computing device.

10. The system of claim 1, wherein the second processor is configured to execute the time detection machine learning model using the set of audio data as input by:

sampling the set of audio data to generate a spectrogram comprising a plurality of impulses from the set of audio data of a defined length in which an impulse for the actionable sound is at a defined time within the spectrogram; and apply the time detection machine learning model to the spectrogram to determine whether the impulse corresponds to the actionable sound, wherein the time detection machine learning model is trained to analyze the impulse at the defined time within the spectrogram and not any other impulses of the plurality of impulses of the spectrogram.

11. The system of claim 1, wherein the second processor is configured to determine the location of the actionable sound based at least on environmental factors in an environment around a location of the first computing device.

12. The system of claim 1, wherein the second processor is further configured to:

receive a plurality of sets of audio data from a plurality of computing devices within a defined time period, each computing device of the plurality of computing devices transmitting at least one set of audio data to the second computing device responsive to determining the at least one set of audio data corresponds to one or more actionable sounds, including the actionable sound;

generate an audio signature for each of the plurality of sets of audio data; and determine a number of guns that fired a gunshot within the defined time period based on a number of unique audio signatures in the plurality of sets of audio data.

13. A method, comprising receiving, by a first computing device, a set of audio data from a microphone;

executing, by the first computing device, a first sound detection machine learning model using the set of audio data as input to determine whether the set of audio data corresponds to an actionable sound, the set of audio data comprising a plurality of sounds; and responsive to determining the set of audio data corresponds to the actionable sound, transmitting, by the first computing device, the set of audio data to a second computing device; and executing, by the second computing device, a time detection machine learning model using the set of audio data as input to determine an instance and time of the actionable sound within the set of audio data; and determining, by the second computing device, a location of the actionable sound based at least on the time of the actionable sound in the set of audio data.

14. The method of claim 13, further comprising:

performing, by the second computing device, an automated action based on the determined location of the actionable sound.

15. The method of claim 14, further comprising:

receiving, by the second computing device, a second set of audio data from a third computing device comprising a third processor, the second set of audio data comprising a second plurality of sounds;

executing, by the second computing device, the time detection machine learning model using the second set of audio data as input to determine a second instance and second time of the actionable sound within the second set of audio data; and determining, by the second computing device, the location of the actionable sound based at least on the second time of the second instance of the actionable sound in the second set of audio data.

16. The method of claim 15, further comprising:

receiving, by the third computing device, the second set of audio data from a second microphone;

executing, by the third computing device, a second sound detection machine learning model using the second set of audio data as input to determine whether the second set of audio data corresponds to the actionable sound, and transmitting, by the third computing device, the second set of audio data to the second computing device responsive to determining, based on the execution of the second sound detection machine learning model, the second set of audio data corresponds to the actionable sound.

17. The method of claim 13, comprising:

determining, by the second computing device, the location of the actionable sound using multilateration techniques on the time of the actionable sound.

18. The method of claim 13, further comprising:

transmitting, by the second computing device, an indication of the location of the actionable sound to a remote computing device.

19. The method of claim 18, wherein receipt of the indication of the location of the actionable sound by the remote computing device causes the remote computing device to direct a camera to the location of the actionable sound and activate a livestream with the camera.

20. The method of claim 13, further comprising:

receiving, by the second computing device, a second set of audio data from a third computing device;

identifying, by the second computing device, a location of the third computing device;

determining, by the second computing device, a time in which the actionable sound reached the third computing device based at least on the location of the actionable sound.

* * * * *